United States Patent
Wang et al.

(10) Patent No.: US 12,497,412 B2
(45) Date of Patent: Dec. 16, 2025

(54) COMPOUND AS HIGHLY SELECTIVE ROS1 INHIBITOR AND USE THEREOF

(71) Applicant: GUANGZHOU JOYO PHARMATECH CO., LTD, Guangdong (CN)

(72) Inventors: Jianfei Wang, Shanghai (CN); Guangwen Yang, Shanghai (CN); Jikui Sun, Shanghai (CN); Zhihua Ao, Shanghai (CN); Peng Li, Shanghai (CN); Yang Zhang, Shanghai (CN); Qiu Li, Shanghai (CN); Jian Li, Shanghai (CN); Shuhui Chen, Shanghai (CN)

(73) Assignee: GUANGZHOU JOYO PHARMATECH CO., LTD., Guangdong (CN)

( * ) Notice: Subject to any disclaimer, the term of this patent is extended or adjusted under 35 U.S.C. 154(b) by 844 days.

(21) Appl. No.: 17/777,154

(22) PCT Filed: Nov. 18, 2020

(86) PCT No.: PCT/CN2020/129652
§ 371 (c)(1),
(2) Date: May 16, 2022

(87) PCT Pub. No.: WO2021/098703
PCT Pub. Date: May 27, 2021

(65) Prior Publication Data
US 2023/0002410 A1    Jan. 5, 2023

(30) Foreign Application Priority Data

Nov. 18, 2019  (CN) .................. 201911128342.0
May 9, 2020   (CN) .................. 202010388478.1
Sep. 21, 2020  (CN) .................. 202010995918.X

(51) Int. Cl.
C07D 498/22   (2006.01)
A61P 11/00    (2006.01)
A61P 35/00    (2006.01)

(52) U.S. Cl.
CPC ............ *C07D 498/22* (2013.01); *A61P 11/00* (2018.01); *A61P 35/00* (2018.01)

(58) Field of Classification Search
CPC ......... C07D 498/22; A61P 11/00; A61P 35/00
(Continued)

(56) References Cited

U.S. PATENT DOCUMENTS 9,493,476 B2    11/2016  Andrews et al.
11,464,780 B2 *  10/2022  Wang et al. ......... A61K 31/529
(Continued)

FOREIGN PATENT DOCUMENTS

CN   101679429 A   3/2010
CN   102971322 A   3/2013
(Continued)

OTHER PUBLICATIONS

Johnson TW, et al. Discovery of (10 R)-7-Amino-12-fluoro-2, 10, 16-trimethyl-15-oxo-10, 15, 16, 17-tetrahydro-2H-8, 4-(metheno) pyrazolo [4, 3-h][2, 5, 11]-benzoxadiazacyclotetradecine-3-carbonitrile (PF-06463922) ... Journal of medicinal chemistry. Jun. 12, 2014;57(11):4720-44. (Year: 2014).*
(Continued)

*Primary Examiner* — Jeffrey S Lundgren
*Assistant Examiner* — Heather Dahlin
(74) *Attorney, Agent, or Firm* — Harness, Dickey & Pierce, P.L.C.

(57) ABSTRACT

Disclosed are a class of compounds having a highly selective inhibition of ROS1, and the use thereof in the preparation of drugs for treating diseases related to abnormal
(Continued)

ROS1 kinase expression. Specifically disclosed are compounds represented by formula (IV) and a pharmaceutically acceptable salt thereof.

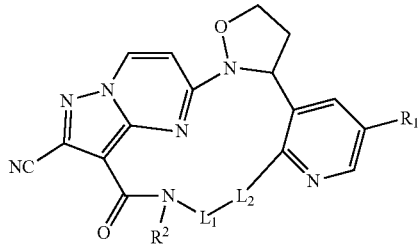

(IV)

20 Claims, 1 Drawing Sheet

(58) Field of Classification Search
USPC .......................................................... 514/257
See application file for complete search history.

(56) References Cited

U.S. PATENT DOCUMENTS

| | | | |
|---|---|---|---|
| 2010/0204246 | A1 | 8/2010 | Davies et al. |
| 2018/0186813 | A1 | 7/2018 | Cui et al. |
| 2019/0076437 | A1 | 3/2019 | Andrews et al. |
| 2021/0403485 | A1 | 12/2021 | Wang et al. |
| 2022/0162218 | A1 | 5/2022 | Zhu et al. |

FOREIGN PATENT DOCUMENTS

| | | | | |
|---|---|---|---|---|
| CN | | 107735399 | A | 2/2018 |
| WO | WO-2018170381 | A1 | | 9/2018 |
| WO | WO-2019094143 | A1 | | 5/2019 |
| WO | WO-2019165967 | A1 | | 9/2019 |
| WO | WO-2019206069 | A1 | | 10/2019 |
| WO | WO2019210835 | A1 | * | 11/2019 ........... C07D 487/04 |
| WO | WO-2020063965 | A1 | | 4/2020 |

OTHER PUBLICATIONS

Patani GA, LaVoie EJ. Bioisosterism: a rational approach in drug design. Chemical reviews. Dec. 19, 1996;96(8):3147-76. (Year: 1996).*
WO2019210835A1, translation, google patents, published 2019, retrieved 2025. (Year: 2025).*
Feb. 23, 2021 International Search Report issued in International Patent Application No. PCT/CN2020/129652.
Feb. 23, 2021 Written Opinion of the International Searching Authority issued in International Patent Application No. PCT/CN2020/129652.
Oct. 25, 2022 First Office Action issued in Indian Patent Application No. 202217033880.
Jan. 2, 2023 First Office Action issued in European Patent Application No. 20889015.2.
Priority document—Chinese Patent Application No. 201911128342.0 (not published) for the subject application.
Priority document—Chinese Patent Application No. 202010388478.1 (not published) for the subject application.
Priority document—Chinese Patent Application No. 202010995918.X (not published) for the subject application.
May 9, 2023 First Office Action issued in Japanese Patent Application No. 2022-529102.
Apr. 21, 2023 First Office Action issued in Eurasian Patent Application No. 202291508.
Jan. 12, 2024 First Office Action issued in Indonesian Patent Application No. P00202206442.
Dec. 8, 2023 First Office Action issued in Chinese Patent Application No. 202080080094.1.
Dec. 8, 2023 Search Report issued in Chinese Patent Application No. 202080080094.1.

* cited by examiner

COMPOUND AS HIGHLY SELECTIVE ROS1 INHIBITOR AND USE THEREOF

CROSS-REFERENCE TO RELATED APPLICATIONS

The present application is a U.S. National Phase Application under 35 U.S.C. 371 of International Application No. PCT/CN2020/129652, filed on Nov. 18, 2020, which claims the benefit of Chinese Patent Application No. 201911128342.0, filed on Nov. 18, 2019, Chinese Patent Application No. 202010388478.1, filed on May 9, 2020, and Chinese Patent Application No. 202010995918.X, filed on Sep. 21, 2020 The entire disclosures of the above applications are incorporated herein by reference.

TECHNICAL FIELD

The present disclosure relates to a class of compounds with highly selective ROS1 inhibitory effect, and a use thereof in the manufacture of a medicament for diseases related to abnormal expression of ROS1 kinase. Specifically, the present disclosure relates to compounds represented by formula (IV) and a pharmaceutically acceptable salt thereof.

BACKGROUND

Protein kinases play an important role in human body, and widely participate in the proliferation, differentiation, metabolism, apoptosis and other processes of various cells in human body. Oncogenic forms of protein kinases are abundantly expressed in a variety of different human tumor types and are highly responsive to a number of specific kinase inhibitors. C-rosoncogenel receptortyrosinekinase (ROS1) belongs to insulin receptor superfamily, which is widely involved in cell growth, proliferation and transformation by regulating the main signal pathways such as RAS/MAPK, PI3K/AKT and STAT3, and may be involved in the development and maturation of organs. Abnormal expression of ROS1 kinase, such as gene point mutation, over-expression and gene fusion, can result in dysregulated kinase activity and is associated with many human cancer types.

A ROS1 fusion kinase loses the extracellular domain, but retains the transmembrane and intracellular tyrosine kinase domains. It can be activated constitutively without ligand binding, induce tumorigenesis and drive the survival and proliferation of tumor cells by phosphorylating substrate proteins. The CD74-ROS1 gene fusion was first discovered in NSCLC patients in 2007, and more than 14 partner genes have been identified so far. ROS1 gene fusion is another clear NSCLC driver gene after EGFR mutation and ALK fusion. The positive incidence rate in East Asia is about 2 to 3%, and that in Europe and America is about 1 to 2%. In March 2016, based only on the data from 50 patients (PROFILE 1001), FDA approved Crizotinib for the treatment of ROS1 gene fusion NSCLC. The curative effect of the crizotinib is remarkable (objective response rate is 72%), but it will develop to drug resistance after about one year. Wherein, brain metastasis (up to 47%) and drug resistance mutations in ROS1 kinase (about 50 to 60%, with solvent front mutation G2032R accounting for about 40%) are proved to be the main drug resistance mechanisms of the crizotinib. For patients with brain metastasis, although the drugs Entrectinib (RXDX-101) and Lorlatinib which can enter the brain may bring further PFS benefits, it is inevitable that there will still be acquired drug resistance mutations. After the failure of first-line or second-line treatment, there will be no drug available. For patients with acquired G2032R solvent front drug resistance mutation, there are currently no marketed targeted drugs available. Among the ROS1 inhibitors under clinical research, only Repotrectinib (TPX-0005) developed by TP Therapeutics has been proven effective in patients with G2032R solvent front drug resistance mutations. However, like all other clinical ROS1 inhibitors, Repotrectinib (TPX-0005) is also a multi-kinase inhibitor, which has significant off-target side effects. In particular, Entrectinib (RXDX-101) and Repotrectinib (TPX-0005) are both strong pan-NTRK inhibitors, and both have widespread clinical side effects such as taste disorder, dizziness, paresthesia, and weight gain. These side effects may be related to the off-target caused by their strong inhibition of Trk kinase. For patients with only ROS1 gene fusion, in addition to the target-related side effects, they also need to bear additional side effects caused by off-target, which will affect the treatment effect and patient experience.

Therefore, for the clinical treatment of NSCLC with ROS1 gene fusion, there is an urgent need for a class of selective ROS1 inhibitors with low off-target side effects, which can break through the blood-brain barrier and be effective for drug resistance mutations in the current market.

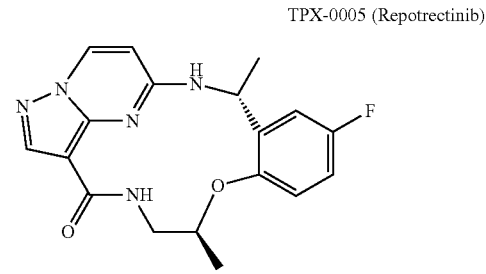 [SMILES: C[C@H]1CNC(=O)c2cnn3ccc(nc23)N[C@H](C)c2cc(F)ccc2O1]

TPX-0005 (Repotrectinib)

Content of the Present Invention

The present disclosure provides a compound represented by formula (IV) or a pharmaceutically acceptable salt thereof,

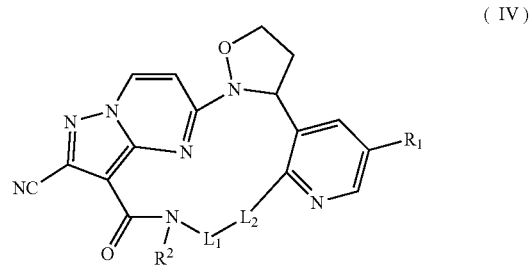

(IV)

wherein, $R_1$ is selected from H, F, Cl, Br, I, OH, $NH_2$, CN and $C_{1-3}$ alkyl optionally substituted with 1, 2 or 3 $R_a$;

$R_2$ is selected from H and $C_{1-3}$ alkyl optionally substituted with 1, 2 or 3 $R_b$;

$L_1$ is selected from —$C_{1-3}$alkyl-, —$C_{3-6}$cycloalkyl- and —$C_{3-6}$ cycloalkyl-$C_{1-3}$alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;

$L_2$ is selected from —$C_{1-3}$ alkyl- and —O—;

$R_a$, $R_b$ and $R_c$ are each independently selected from F, Cl, Br and $CH_3$.

In some embodiments of the present disclosure, the $R_1$ is selected from H, F, Cl, Br, I, OH, $NH_2$, CN and $CH_3$, and the $CH_3$ is optionally substituted with 1, 2 or 3 $R_a$, and other variables are defined in the present disclosure.

In some embodiments of the present disclosure, the $R_1$ is selected from F, and other variables are defined in the present disclosure.

In some embodiments of the present disclosure, the $R_2$ is selected from H and $CH_3$, and other variables are defined in the present disclosure.

In some embodiments of the present disclosure, the $L_1$ is selected from —$CH_2$—, —$CH(CH_3)CH_2$—, -cyclopropyl-$CH_2$— and -cyclobutyl-, and the —$CH_2$—, —$CH(CH_3)CH_2$—, -cyclopropyl-$CH_2$— and -cyclobutyl- are optionally substituted with 1, 2 or 3 $R_c$, and other variables are defined in the present disclosure.

In some embodiments of the present disclosure, the $L_1$ is selected from —$CH_2$—, —$CH(CH_3)CH_2$—,

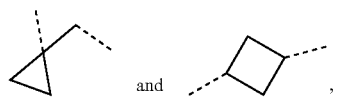
and and other variables are defined in the present disclosure.

In some embodiments of the present disclosure, the $L_2$ is selected from —$CH_2$— and —O—, and other variables are defined in the present disclosure.

In some embodiments of the present disclosure, the structural unit

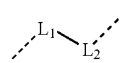

is selected from

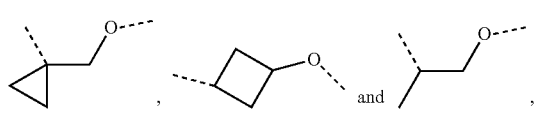
and and other variables are defined in the present disclosure.

In some embodiments of the present disclosure, the structural unit

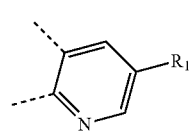

is selected from

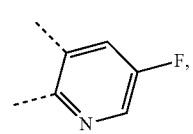

and other variables are defined in the present disclosure.

There are also some embodiments of the present disclosure which are any combination of the above variables.

In some embodiments of the present disclosure, the compound or the pharmaceutically acceptable salt thereof is selected from:

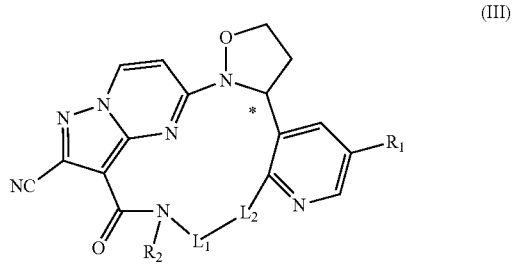

(III)

wherein, $R_1$, $R_2$, $L_1$ and $L_2$ are defined in the present disclosure;

the carbon atoms with "*" are chiral carbon atoms, which exist in a (R) or (S) single enantiomer form or in an enantiomer-rich form.

In some embodiments of the present disclosure, the compound or the pharmaceutically acceptable salt thereof is selected from:

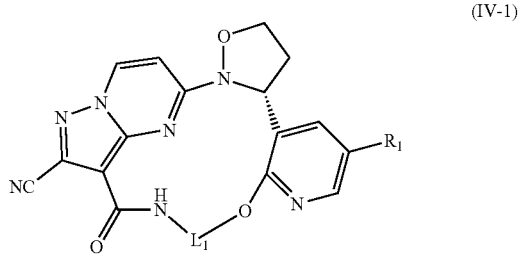

(IV-1)

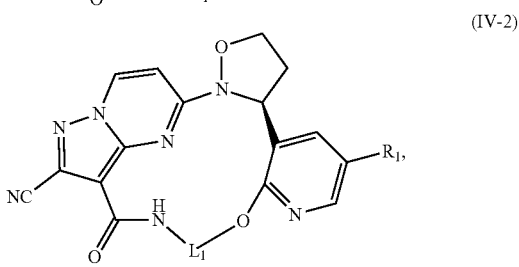

(IV-2)

wherein, $R_1$ and $L_1$ are defined in the present disclosure.

The present disclosure also provides a compound represented by the following formula or a pharmaceutically acceptable salt thereof, selecting from:

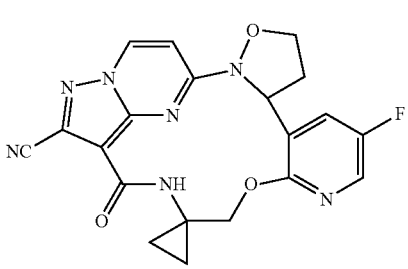

-continued

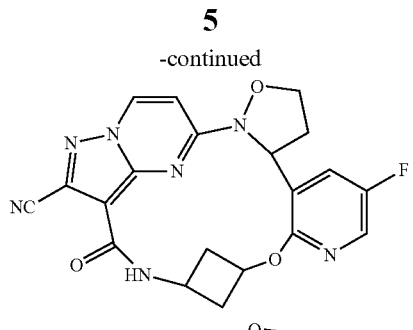

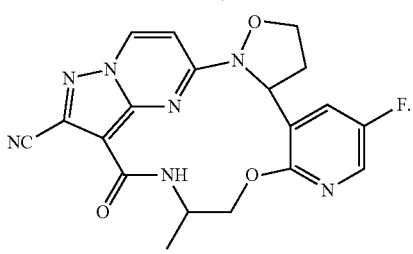

In some embodiments of the present disclosure, the compound or the pharmaceutically acceptable salt thereof is selected from:

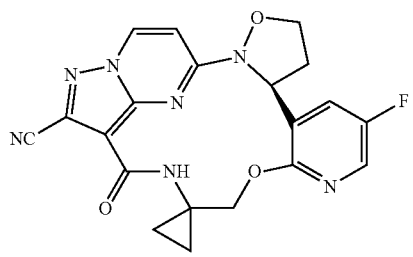

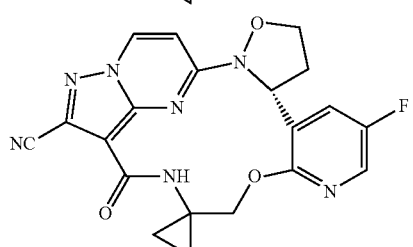

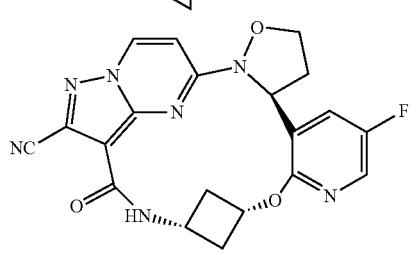

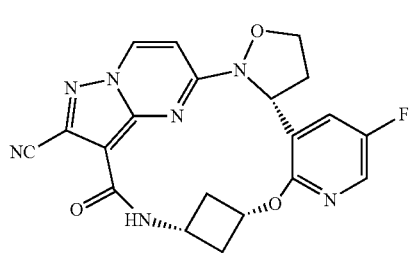

-continued

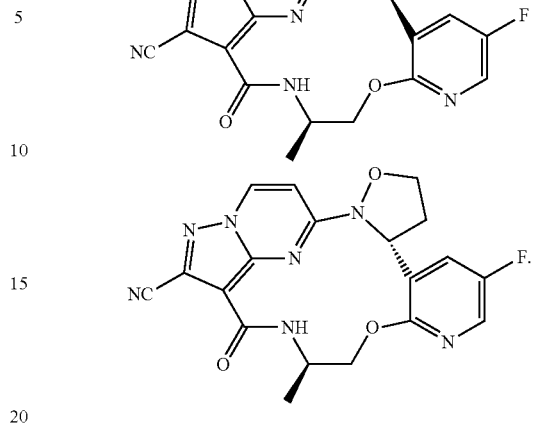

In some embodiments of the present disclosure, a compound represented by formula (V) and a compound represented by formula (VI),

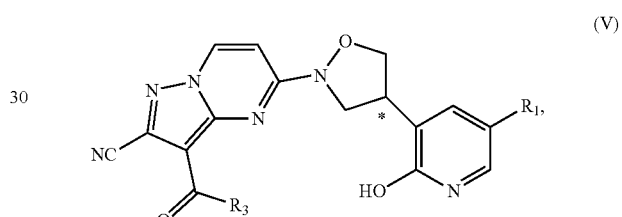

(V)

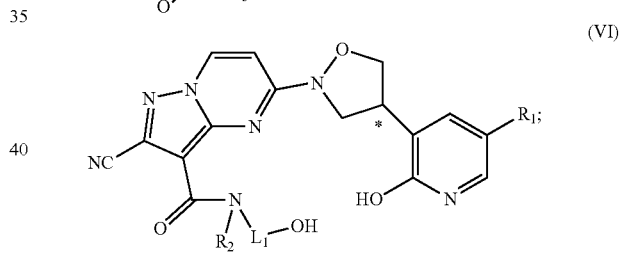

(VI)

wherein, $R_1$ is selected from H, F, Cl, Br, I, OH, $NH_2$, CN and $C_{1-3}$ alkyl optionally substituted with 1, 2 or 3 $R_a$;

$R_2$ is selected from H and $C_{1-3}$ alkyl optionally substituted with 1, 2 or 3 $R_b$;

$R_3$ is selected from OH and O—$C_{1-3}$ alkyl;

$L_1$ is selected from —$C_{1-3}$ alkyl-, —$C_{3-6}$ cycloalkyl- and —$C_{3-6}$ cycloalkyl-$C_{1-3}$ alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;

$R_a$, $R_b$ and $R_c$ are each independently selected from F, Cl, Br and $CH_3$;

the carbon atoms with "*" are chiral carbon atoms, which exist in a (R) or (S) single enantiomer form or in an enantiomer-rich form.

In some embodiments of the present disclosure, the compound represented by formula (VI) is prepared from the compound represented by formula (V) under the conditions of alkali and solvent A,

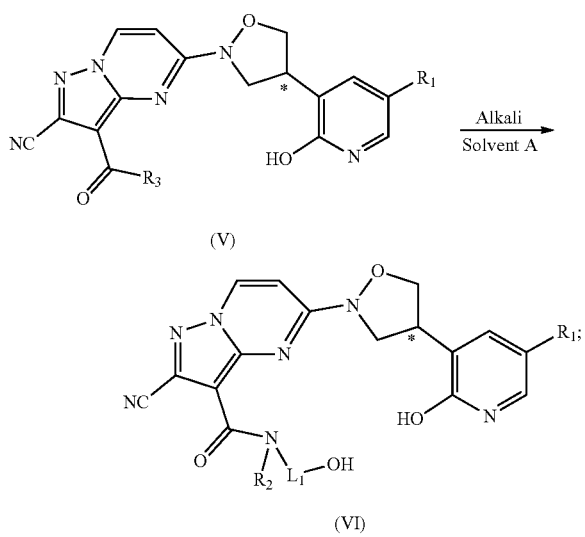

the compound represented by formula (IV-3) or (IV-4) is prepared from the compound represented by formula (VI) under the condition of ligand and solvent B;

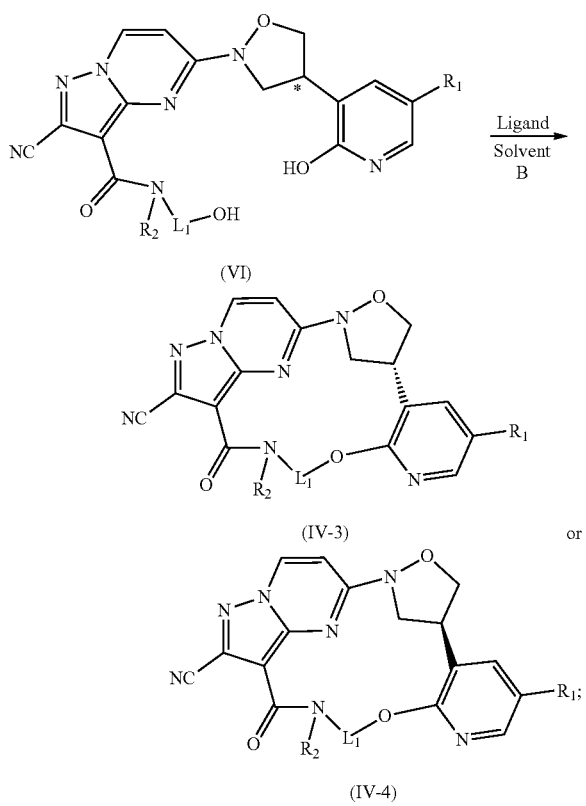

wherein,

R₁ is selected from H, F, Cl, Br, I, OH, NH₂, CN and $C_{1-3}$ alkyl optionally substituted with 1, 2 or 3 $R_a$;

R₂ is selected from H and $C_{1-3}$ alkyl optionally substituted with 1, 2 or 3 $R_b$;

R₃ is selected from OH and O—$C_{1-3}$ alkyl;

L₁ is selected from —$C_{1-3}$ alkyl-, —$C_{3-6}$cycloalkyl- and —$C_{3-6}$cycloalkyl-$C_{1-3}$ alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;

$R_a$, $R_b$ and $R_c$ are each independently selected from F, Cl, Br and $CH_3$;

the carbon atoms with "*" are chiral carbon atoms, which exist in a (R) or (S) single enantiomer form or in an enantiomer-rich form.

When R₃ is selected from OH, the alkali is selected from lithium hydroxide, sodium hydroxide, potassium hydroxide, lithium carbonate, sodium carbonate, potassium carbonate, calcium carbonate, magnesium carbonate, lithium bicarbonate, sodium bicarbonate, potassium bicarbonate, calcium bicarbonate, magnesium bicarbonate, sodium formate, potassium propionate, trimethylamine, triethylamine, pyridine, 4-dimethylaminopyridine or N-ethyldiisopropylamine;

the condensing agent is selected from dicyclohexylcarbodiimide (DCC), bis(2-oxo-3-oxazolidinyl)phosphinic chloride (BOP—Cl), benzotriazole-1-yl-oxytripyrrolidinophosphonium hexafluorophosphate (PYBOP), carbonyl diimidazole (CDI), diisopropyl carbodiimide (DIC), 2-(7-azabenzotriazole)-N,N,N',N'-tetramethyluronium hexafluorophosphate (HATU), benzotriazole-N,N,N',N'-tetramethyluronium hexafluorophosphate (HBTU) and O-benzotriazole-N,N,N',N'-tetramethyluronium tetrafluoroborate (TBTU);

the solvent A is selected from N,N-dimethylformamide, acetonitrile, dichloromethane, dimethyl sulfoxide, N-methylpyrrolidone and N,N-dimethylacetamide;

when R₃ is selected from O—$C_{1-3}$ alkyl, the alkali is selected from lithium hydroxide, sodium hydroxide, potassium hydroxide, lithium carbonate, sodium carbonate, potassium carbonate, calcium carbonate, magnesium carbonate, lithium bicarbonate, sodium bicarbonate, potassium bicarbonate, calcium bicarbonate, magnesium bicarbonate, sodium formate, potassium propionate, trimethylamine, triethylamine, pyridine, 4-dimethylaminopyridine or N-ethyl diisopropylamine.

The ligand is selected from triphenylphosphine, trimethylphenylphosphine, tricyclohexylphosphine, tri-tert-butylphosphine, tributylphosphine and diethylphenylphosphine;

the alkaline reagent is selected from diisopropyl azodicarboxylate and diethyl azodicarboxylate;

the solvent B is selected from toluene, xylene, ethylene glycol dimethyl ether, dioxane, tetrahydrofuran, N,N-dimethylformamide, dimethyl sulfoxide and N-methylpyrrolidone.

In some embodiments of the present disclosure, the compound represented by formula (VI) is prepared from the compound represented by formula (V) under the conditions of alkali and solvent A, and then the compound represented by formula (IV-3) or (IV-4) is prepared from the compound represented by formula (VI) under the condition of ligand and solvent B;

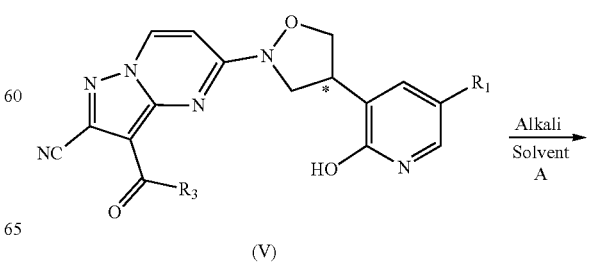

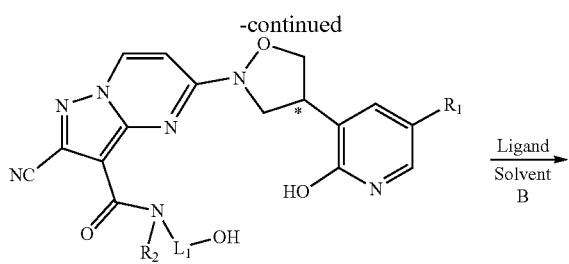

(VI)

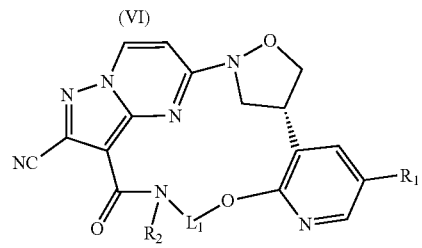

(IV-3) or

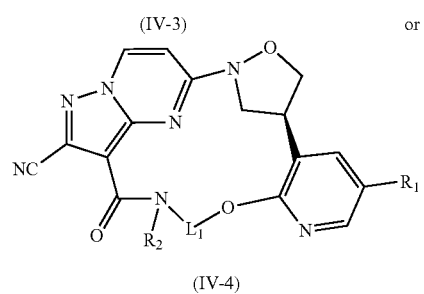

(IV-4)

wherein, $R_1$ is selected from H, F, Cl, Br, I, OH, $NH_2$, CN and $C_{1-3}$ alkyl optionally substituted with 1, 2 or 3 $R_a$;

$R_2$ is selected from H and $C_{1-3}$ alkyl optionally substituted with 1, 2 or 3 $R_b$;

$R_3$ is selected from OH and O—$C_{1-3}$ alkyl;

$L_1$ is selected from —$C_{1-3}$ alkyl-, —$C_{3-6}$cycloalkyl- and —$C_{3-6}$cycloalkyl-$C_{1-3}$ alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;

$R_a$, $R_b$ and $R_c$ are each independently selected from F, Cl, Br and $CH_3$;

the carbon atoms with "*" are chiral carbon atoms, which exist in a (R) or (S) single enantiomer form or in an enantiomer-rich form.

The alkali is selected from lithium hydroxide, sodium hydroxide, potassium hydroxide, lithium carbonate, sodium carbonate, potassium carbonate, calcium carbonate, magnesium carbonate, lithium bicarbonate, sodium bicarbonate, potassium bicarbonate, calcium bicarbonate, magnesium bicarbonate, sodium formate, potassium propionate, trimethylamine, triethylamine, pyridine, 4-dimethylaminopyridine or N-ethyldiisopropylamine;

the solvent A is selected from N,N-dimethylformamide, acetonitrile, dichloromethane, dimethyl sulfoxide, N-methylpyrrolidone and N,N-dimethylacetamide;

the ligand is selected from triphenylphosphine, trimethylphenylphosphine, tricyclohexylphosphine, tri-tert-butylphosphine, tributylphosphine and diethylphenylphosphine;

the solvent B is selected from toluene, xylene, ethylene glycol dimethyl ether, dioxane, tetrahydrofuran, N,N-dimethylformamide, dimethyl sulfoxide and N-methylpyrrolidone.

In some embodiments of the present disclosure, the $R_3$ is selected from OH, O-Me and O-Et.

In some embodiments of the present disclosure, a use of the compound or the pharmaceutically acceptable salt thereof in the manufacture of a medicament related to the treatment of a ROS1 inhibitor.

In some embodiments of the present disclosure, in the use, wherein, the medicament related to the ROS1 inhibitor is a medicament for cancer.

In some embodiments of the present disclosure, in the use, wherein, the medicament related to the ROS1 inhibitor is a medicament for lung cancer.

Synthesis Method:

The compound of the present disclosure can be prepared by a variety of synthetic methods and a series of synthetic steps well known to those skilled in the art.

In general, the compound represented by formula (IV) may be prepared from an intermediate compound represented by formula (V) as a starting material by the following reaction process 1:

Reaction process 1:

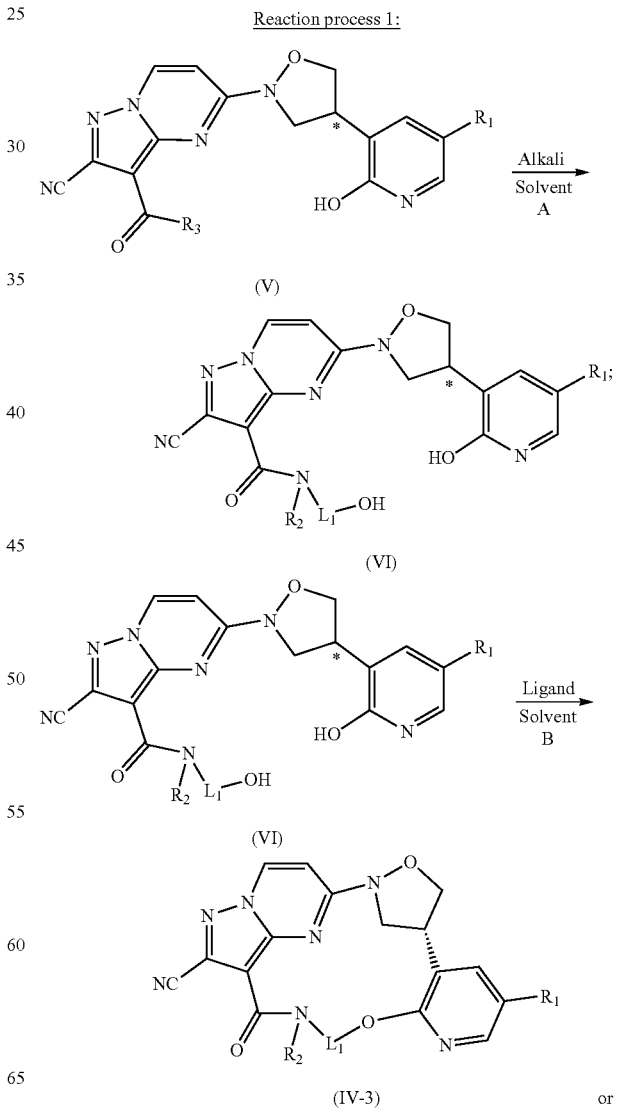

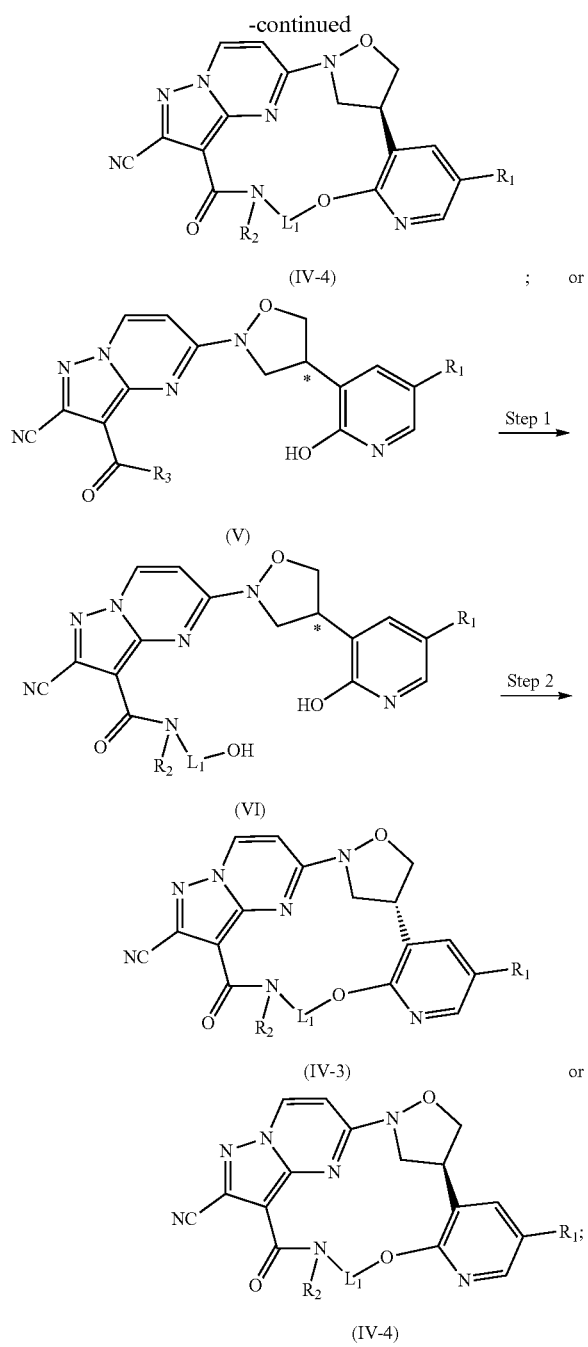

wherein,
R₁ is selected from H, F, Cl, Br, I, OH, NH₂, CN and $C_{1-3}$ alkyl optionally substituted with 1, 2 or 3 $R_a$;
R₂ is selected from H and $C_{1-3}$ alkyl optionally substituted with 1, 2 or 3 $R_b$;
R₃ is selected from OH;
L₁ is selected from —$C_{1-3}$ alkyl-, —$C_{3-6}$cycloalkyl- and —$C_{3-6}$cycloalkyl-$C_{1-3}$ alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;
$R_a$, $R_b$ and $R_c$ are each independently selected from F, Cl, Br and CH₃;
the carbon atoms with "*" are chiral carbon atoms, which exist in a (R) or (S) single enantiomer form or in an enantiomer-rich form.

The compound represented by formula (V), as the raw material of step 1 in the reaction process 1, reacts with

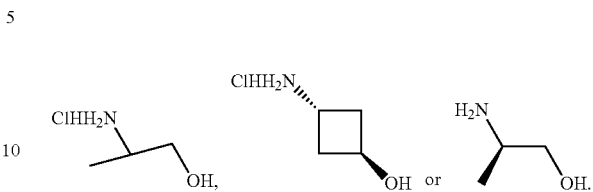

The reaction requires a suitable alkali (e.g., lithium hydroxide, sodium hydroxide, potassium hydroxide, lithium carbonate, sodium carbonate, potassium carbonate, calcium carbonate, magnesium carbonate, lithium bicarbonate, sodium bicarbonate, potassium bicarbonate, calcium bicarbonate, magnesium bicarbonate, sodium formate, potassium propionate, trimethylamine, triethylamine, pyridine, 4-dimethylaminopyridine or N-ethyldiisopropylamine), the condensing agent (e.g., dicyclohexylcarbodiimide (DCC), bis (2-oxo-3-oxazolidinyl)phosphinic chloride (BOP—Cl), benzotriazole-1-yl-oxytripyrrolidinophosphonium hexafluorophosphate (PYBOP), carbonyl diimidazole (CDI), diisopropyl carbodiimide (DIC), 2-(7-azabenzotriazole)-N,N,N',N'-tetramethyluronium hexafluorophosphate (HATU), benzotriazole-N,N,N',N'-tetramethyluronium hexafluorophosphate (HBTU), or O-benzotriazole-N,N,N', N'-tetramethyluronium tetrafluoroborate (TBTU)), a suitable solvent A (e.g., N,N-dimethylformamide, acetonitrile, dichloromethane, dimethyl sulfoxide, N-methylpyrrolidone or N,N-dimethylacetamide), and a reaction temperature of 20° C. to 30° C. to carry out the reaction.

In reaction step 2, the compound represented by formula (IV) is prepared from the compound represented by formula (VI) under the condition of ligand and solvent. The reaction requires the ligand (e.g., triphenylphosphine, trimethylphenylphosphine, tricyclohexylphosphine, tri-tert-butylphosphine, tributylphosphine and diethylphenylphosphine), the alkaline reagent (e.g., diisopropyl azodicarboxylate or diethyl azodicarboxylate), suitable solvent B (e.g., toluene, xylene, ethylene glycol dimethyl ether, dioxane, tetrahydrofuran, N,N-dimethylformamide, dimethyl sulfoxide and N-methylpyrrolidone), and a reaction temperature of 20° C. to 30° C. to carry out the reaction.

The compound represented by formula (V) may be prepared according to general reaction process well known to those skilled in the art. For example, the compound represented by formula (V) can be prepared according to reaction process 2:

Reaction process 2:

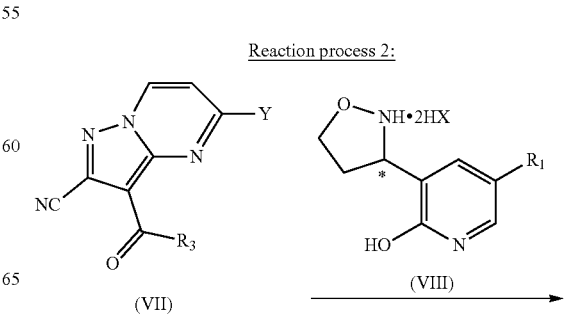

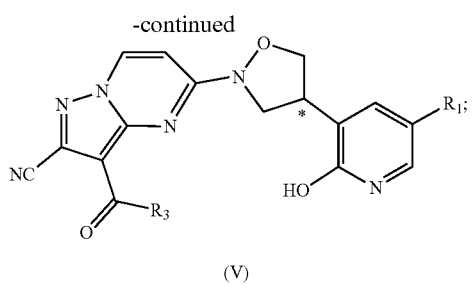

(V)

wherein, Y is selected from OTf, OTs and OSO₂Ph; X is selected from F, Cl, Br and I; R₃ is selected from OH and O—C₁₋₃ alkyl;

the carbon atoms with "*" are chiral carbon atoms, which exist in a (R) or (S) single enantiomer form or in an enantiomer-rich form.

In the reaction step, the compound represented by formula (VII) is reacted with the compound represented by formula (VIII) under the condition of alkali and suitable solvent. The reaction requires the alkali (triethylamine, pyridine, N-methylmorpholine, N,N-diisopropylethylamine or 4-dimethylaminopyridine), a suitable solvent (e.g., N,N-dimethylformamide, acetonitrile, dichloromethane, isopropanol, dimethyl sulfoxide, N-methylpyrrolidone or N,N-dimethylacetamide), and a reaction temperature of 20° C. to 50° C. to carry out the reaction.

The compound represented by formula (V-1) can be prepared according to general reaction process well known to those skilled in the art. For example, the compound represented by formula (V-1) can be prepared according to the reaction process 3:

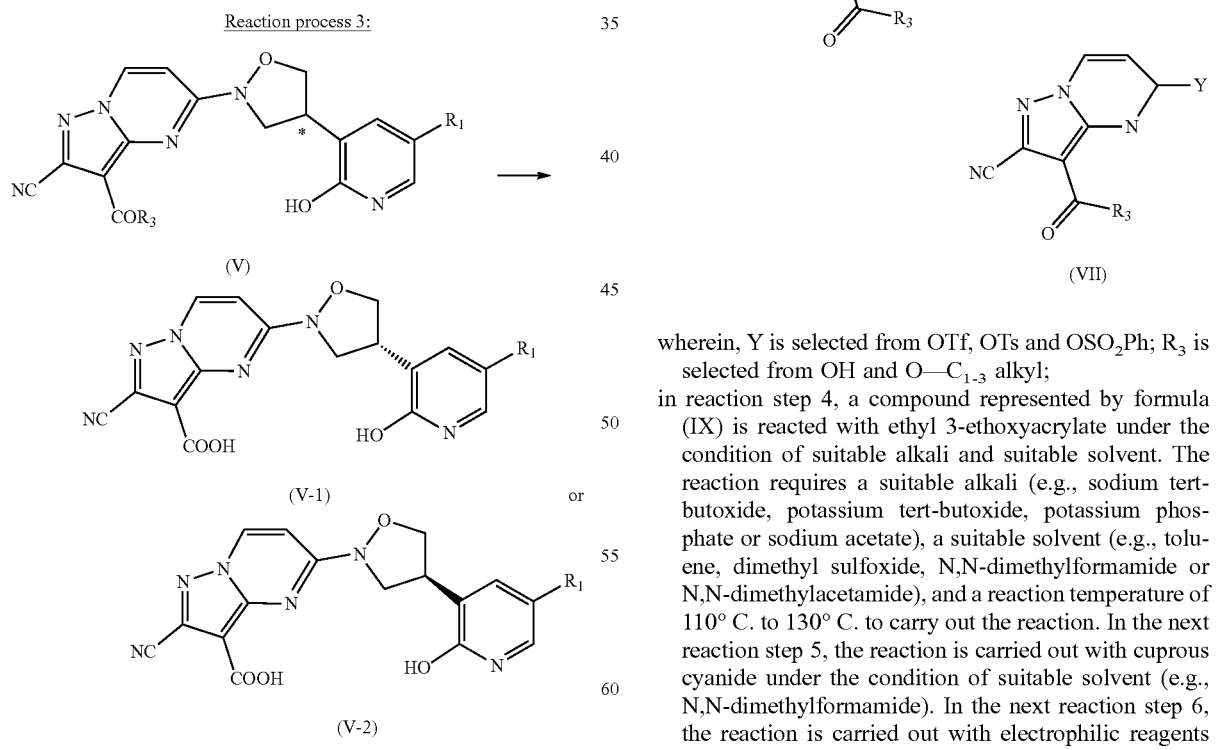

wherein, R₃ is selected from O—C₁₋₃ alkyl;

the carbon atoms with "*" are chiral carbon atoms, which exist in a (R) or (S) single enantiomer form or in an enantiomer-rich form.

In the reaction step, the compound represented by formula (V-1) is reacted in a suitable alkali (e.g., lithium hydroxide monohydrate) and a suitable solvent (e.g., tetrahydrofuran) at a reaction temperature of 20° C. to 30° C.

The compound represented by formula (VII) can be prepared according to general reaction process well known to those skilled in the art. For example, the compound represented by formula (VII) can be prepared according to the reaction process 4:

Reaction process 4:

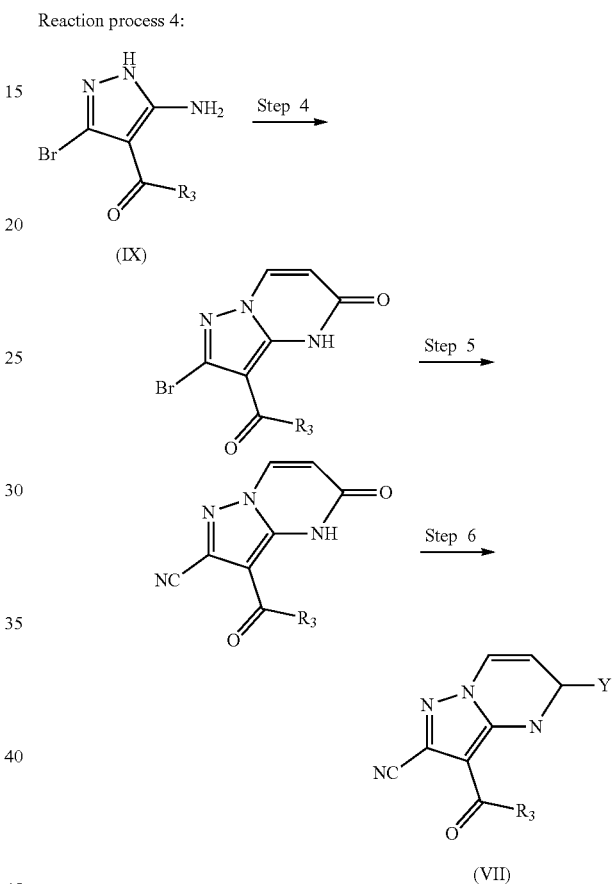

wherein, Y is selected from OTf, OTs and OSO₂Ph; R₃ is selected from OH and O—C₁₋₃ alkyl;

in reaction step 4, a compound represented by formula (IX) is reacted with ethyl 3-ethoxyacrylate under the condition of suitable alkali and suitable solvent. The reaction requires a suitable alkali (e.g., sodium tert-butoxide, potassium tert-butoxide, potassium phosphate or sodium acetate), a suitable solvent (e.g., toluene, dimethyl sulfoxide, N,N-dimethylformamide or N,N-dimethylacetamide), and a reaction temperature of 110° C. to 130° C. to carry out the reaction. In the next reaction step 5, the reaction is carried out with cuprous cyanide under the condition of suitable solvent (e.g., N,N-dimethylformamide). In the next reaction step 6, the reaction is carried out with electrophilic reagents (e.g., trifluoromethanesulfonyl chloride, p-toluenesulfonyl chloride, benzenesulfonyl chloride) in a suitable alkali (e.g., triethylamine) and a suitable solvent (e.g., dichloromethane) at a reaction temperature of 20° C. to 30° C.

Technical Effect

The compound of the present disclosure shows high kinase inhibitory activity on ROS1 kinase and a mutant ROS1-G2032R thereof, which is comparable to the activity of TPX-0005. However, the compound of the present disclosure has weak inhibitory activity on TrkA and ALK kinases, showing high selectivity, which is significantly better than that of TPX-0005. The compound of the present disclosure shows high cell proliferation inhibitory activity on the ROS1-fused cell line Ba/F3 SLC34A2-ROS1 and a mutant cell line Ba/F3 SLC34A2-ROS1-G2032R thereof. The compound of the present disclosure shows weak inhibitory activity on the Ba/F3 LMNA-NTRK1-WT cell line, and compared with Ba/F3 SLC34A2-ROS1 cell line and Ba/F3 SLC34A2-ROS1-G2032R cell line, especially Ba/F3 SLC34A2-ROS1-G2032R cell line, the compound of the present disclosure shows significant inhibitory selectivity. The compound of the the present disclosure shows excellent pharmacokinetic characteristics; the compound of the the present disclosure has a significant tumor inhibiting effect.

Definition and Description

Unless otherwise specified, the following terms and phrases when used herein have the following meanings. A specific term or phrase should not be considered indefinite or unclear in the absence of a particular definition, but should be understood in the ordinary sense. When a trade name appears herein, it is intended to refer to its corresponding commodity or active ingredient thereof.

The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, an allergic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by bringing the neutral form of the compound into contact with a sufficient amount of base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by bringing the neutral form of the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to any base or acid addition salt.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof.

Unless otherwise specified, the term "isomer" is intended to include geometric isomer, a cis-trans isomer, a stereoisomer, an enantiomer, an optical isomer, a diastereoisomer, and a tautomer.

The compounds of the present disclosure may exist in specific geometric or stereoisomeric forms. The present disclosure contemplates all such compounds, including cis and trans isomers, (−)-and (+)-enantiomers, (R)-and (S)-enantiomers, diastereomers isomers, (D)-isomers, (L)-isomers, and racemic and other mixtures thereof, such as enantiomers or diastereomeric enriched mixtures, all of which are within the scope of the present disclosure. Additional asymmetric carbon atoms may be present in substituents such as alkyl. All these isomers and their mixtures are included within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(+)" refers to dextrorotation, "(−)" refers to levorotation, and or "(±)" refers to racemic.

Unless otherwise specified, the absolute configuration of a stereogenic center is represented by a wedged solid bond ( ) and a wedged dashed bond ( ), and the relative configuration of a stereogenic center is represented by a straight solid bond ( ) and a straight dashed bond ( ), a wave line ( ) is used to represent a wedged solid bond ( ) or a wedged dashed bond ( ), or the wave line ( ) is used to represent a straight solid bond ( ) or a straight dashed bond ( ).

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomeric excess" refers to the difference between the relative percentages of two isomers or two enantiomers. For example, if the content of one isomer or enantiomer is 90%, and the content of the other isomer or enantiomer is 10%, the isomer or enantiomer excess (ee value) is 80%.

Optically active (R)- and (S)-isomer, or D and L isomer can be prepared using chiral synthesis or chiral reagents or other conventional techniques. If one kind of enantiomer of certain compound of the present disclosure is to be obtained, the pure desired enantiomer can be obtained by asymmetric synthesis or derivative action of chiral auxiliary followed by separating the resulting diastereomeric mixture and cleaving the auxiliary group. Alternatively, when the molecule contains a basic functional group (such as amino) or an acidic functional group (such as carboxyl), the compound reacts with an appropriate optically active acid or base to form a salt of the diastereomeric isomer which is then subjected to diastereomeric resolution through the conventional method in the art to obtain the pure enantiomer. In addition, the enantiomer and the diastereoisomer are generally isolated through chromatography which uses a chiral stationary phase and optionally combines with a chemical derivative method (such as carbamate generated from amine).

The compound of the present disclosure may contain an unnatural proportion of atomic isotope at one or more than one atom(s) that constitute the compound. For example, the compound can be radiolabeled with a radioactive isotope, such as tritium ($^3H$), iodine-125 ($^{125}I$) or C-14 ($^{14}C$). For another example, deuterated drugs can be formed by replacing hydrogen with heavy hydrogen, the bond formed by deuterium and carbon is stronger than that of ordinary hydrogen and carbon, compared with non-deuterated drugs, deuterated drugs have the advantages of reduced toxic and side effects, increased drug stability, enhanced efficacy, extended biological half-life of drugs, etc. All isotopic variations of the compound of the present disclosure, whether radioactive or not, are encompassed within the scope of the present disclosure.

The term "optional" or "optionally" means that the subsequent event or condition may occur but not requisite, that the term includes the instance in which the event or condition occurs and the instance in which the event or condition does not occur.

The term "substituted" means one or more than one hydrogen atom(s) on a specific atom are substituted with the substituent, including deuterium and hydrogen variables, as long as the valence of the specific atom is normal and the substituted compound is stable. When the substituent is an oxygen (i.e., =O), it means two hydrogen atoms are substituted. Positions on an aromatic ring cannot be substituted with a ketone. The term "optionally substituted" means an atom can be substituted with a substituent or not, unless otherwise specified, the type and number of the substituent may be arbitrary as long as being chemically achievable.

When any variable (such as R) occurs in the constitution or structure of the compound more than once, the definition of the variable at each occurrence is independent. Thus, for example, if a group is substituted with 0-2 R, the group can be optionally substituted with up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When the number of a substituent is 0, it means that the substituent does not exist, for example, -A-(R)$_0$ represents that the structure is actually -A.

When a substituent is vacant, it means that the substituent does not exist, for example, when X is vacant in A-X, the structure of A-X is actually A.

When one of the variables is selected from a single bond, it means that the two groups linked by the single bond are connected directly. For example, when L in A-L-Z represents a single bond, the structure of A-L-Z is actually A-Z.

When the bond of a substituent can be cross-linked to two or more atoms in a ring, the substituent can be bonded to any atom in the ring, for example, the structural unit

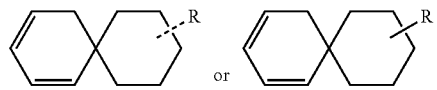

represents that the substituent R can be substituted at any position on cyclohexyl or cyclohexadiene. When the enumerative substituent does not indicate by which atom it is linked to the group to be substituted, such substituent can be bonded by any atom thereof. For example, when pyridyl acts as a substituent, it can be linked to the group to be substituted by any carbon atom on the pyridine ring.

When the enumerative linking group does not indicate the direction for linking, the direction for linking is arbitrary, for example, the linking group L contained in

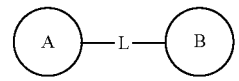

is -M-W—, then -M-W— can link ring A and ring B to form

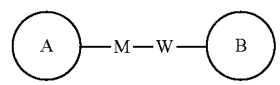

in the direction same as left-to-right reading order, and form

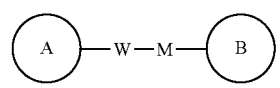

in the direction contrary to left-to-right reading order. A combination of the linking groups, substituents and/or variables thereof is allowed only when such combination can result in a stable compound.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of chemical bond linking thereto so as to meet the corresponding valence. The chemical bond between the site and other groups can be represented by a straight solid bond ($\diagup$), a straight dashed bond ($\diagup$) or a wavy line

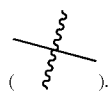

(      ).

For example, the straight solid bond in —OCH$_3$ means that it is linked to other groups through the oxygen atom in the group; the straight dashed bonds in

means that it is linked to other groups through the two ends of nitrogen atom in the group; the wave lines in

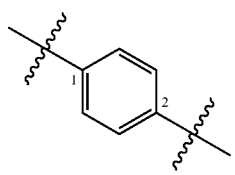 [SMILES: *c1ccc(*)cc1]

means that the phenyl group is linked to other groups through carbon atoms at position 1 and position 2;

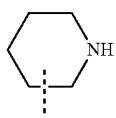

means that it can be linked to other groups through any linkable sites on the piperidinyl by one chemical bond, including at least four types of linkage, including

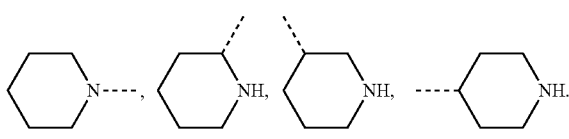

Even though the H atom is drawn on the —N—,

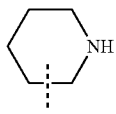

still includes the linkage of,

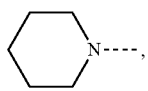

merely when one chemical bond is connected, the H of this site will be reduced by one to the corresponding monovalent piperidinyl.

Unless otherwise specified, the number of atoms in a ring is generally defined as the number of elements of a ring, e.g., "5- to 7-membered ring" refers to a "ring" composed of 5-7 joined atoms.

The term "protecting group" includes, but is not limited to "amino protecting group", "hydroxy protecting group" or "thio protecting group". The term "amino protecting group" refers to a protecting group suitable for blocking the side reaction on the nitrogen of an amino. Representative amino protecting groups include, but are not limited to: formyl; acyl, such as alkanoyl (e.g., acetyl, trichloroacetyl or trifluoroacetyl); alkoxycarbonyl, such as tert-butoxycarbonyl (Boc); arylmethoxycarbonyl such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl) methyl; silyl, such as trimethylsilyl (TMS) and tert-butyldimethylsilyl (TBS) and the like. The term "hydroxy protecting group" refers to a protecting group suitable for blocking the side reaction on hydroxy. Representative hydroxy protecting groups include, but are not limited to: alkyl, such as methyl, ethyl, and tert-butyl; acyl, such as alkanoyl (e.g., acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tert-butyl dimethyl silyl (TBS) and the like.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by direct method (Shelxs97), so that the absolute configuration could be confirmed.

The solvent used in the present disclosure is commercially available.

The following abbreviations are used in the present disclosure: aq represents water; HATU represents 2-(7-azabenzotriazole)-N,N,N',N'-tetramethyluronium hexafluorophosphate; eq represents equivalent; DCM represents dichloromethane; PE represents petroleum ether; DMSO represents dimethyl sulfoxide; EtOAc represents ethyl acetate; EtOH represents ethanol; MeOH represents methanol; Cbz represents benzyloxycarbonyl, which is an amine protecting group; Boc represents tert-butoxycarbonyl, which is an amine protecting group; r.t. represents room temperature; O/N represents overnight; THF represents tetrahydrofuran; Boc$_2$O represents di-tert-butyl dicarbonate; TFA represents trifluoroacetic acid; DIPEA represents diisopropylethylamine; iPrOH represents 2-propanol; and mp represents melting point.

The compounds of the present disclosure are named according to the conventional naming principles in the art or by ChemDraw® software, and the commercially available compounds use the supplier catalog names.

DETAILED DESCRIPTION OF THE PREFERRED EMBODIMENT

Figure 1:
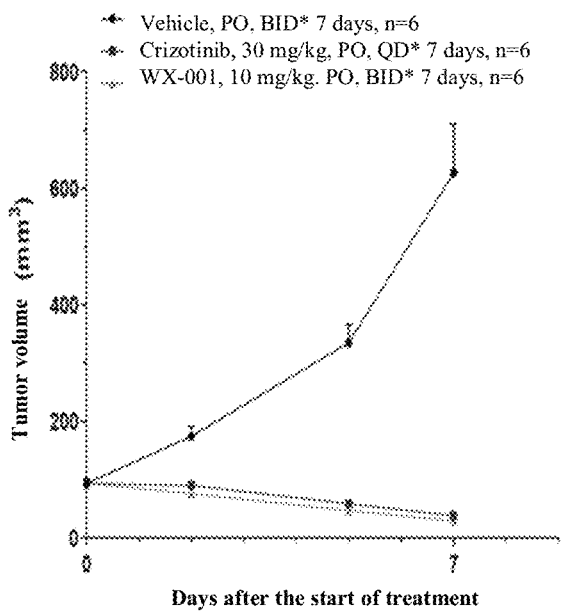
FIG. 1: Ba/F3 CD74-ROS1-WT subcutaneous xenograft tumor model; and Vehicle represents solvent control group.

The present disclosure will be specifically described below by way of embodiments, but the scope of the present disclosure is not limited thereto. The present disclosure is described in detail herein, and specific embodiments thereof have also been disclosed. For those skilled in the art, it is obvious that various changes and improvements can be made to the specific embodiments of the present disclosure without departing from the spirit and scope of the present disclosure.

Reference Embodiment 2: Synthesis of Intermediate A-2

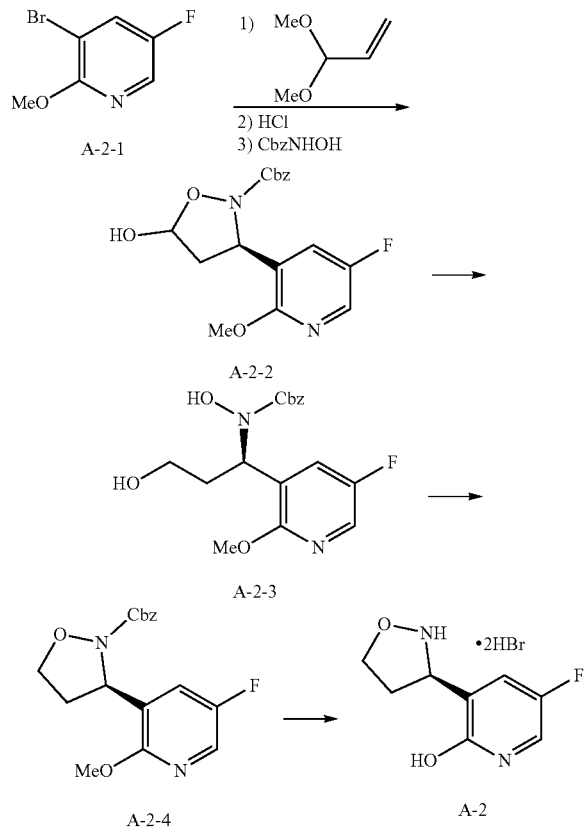

Step 1: Synthesis of Compound A-2-2

In a 5 L three-necked flask, under stirring, compound A-2-1 (170 g, 825.19 mmol, 1 eq) was added to a mixed solvent of N,N-dimethylformamide (850 mL) and water (340 mL), and then potassium carbonate (171.07 g, 1.24 mol, 1.5 eq), tetrabutylammonium acetate (497.61 g, 1.65 mol, 2 eq) and 3,3-dimethoxypropylene (252.83 g, 2.48 mol, 3 eq) were added sequentially. After nitrogen replacement for three times, palladium acetate (2.55 g, 11.36 mmol) was added, and the mixture was slowly heated to 95° C. in a nitrogen atmosphere (the heating time was 1.5 hours), stirred and reacted at this temperature for 16 hours. The reaction solution was cooled to 5° C., then the aqueous hydrochloric acid solution (4 M, 860 mL, 4.17 eq) was added dropwise, and an internal temperature was controlled at 10 to 20° C. (the dropwise addition time was 25 minutes); the mixture was stirred and reacted continuously at 20 to 25° C. for 30 minutes after the dropwise addition. Sodium bicarbonate was slowly added into the reaction flask, and the pH was adjusted to 6-7. After stirring for 20 minutes, the reaction solution was extracted with methyl tert-butyl ether for three times (the volume of the first and second extraction was 1360 mL, and the volume of the third extraction was 850 mL). All organic phases were combined, washed twice with saturated sodium chloride solution (850 mL each time), dried with anhydrous sodium sulfate (170 g), filtered under reduced pressure, and a filtrate was concentrated under vacuum at 45 to 50° C. to obtain a concentrate. The concentrate was slurried with a mixed solvent of n-heptane and methyl tert-butyl ether (510 mL; a volume ratio of the n-heptane to the methyl tert-butyl ether was 5.6:1) for 10 minutes, filtered, and the filter cake was dried under vacuum to obtain a crude product. (R)-diphenylprolinol trimethylsilyl ether (135.12 g, 415.09 mmol, 0.2 eq) was dissolved in dichloromethane (1500 mL), and the mixture was cooled to 0 to 5° C. The above crude product and benzoic acid (50.69 g, 415.09 mmol, 0.2 eq) were added under stirring, and the mixture was stirred at 0 to 5° C. for 0.5 hours. The temperature was then cooled to −5 to −7° C., and benzyl N-hydroxycarbamate (416.33 g, 2.49 mol, 1.2 eq) was added, and the mixture was stirred and reacted continuously at -5 to 10° C. for 4 hours. After the reaction was completed, the reaction solution was cooled to 0 to 5° C. and filtered. The filter cake was washed with dichloromethane (500 mL), and the filter cake was dried under vacuum at 45° C. for 16 hours to obtain compound A-2-2. $^1$H NMR (400 MHz, CDCl$_3$) δ: 7.98 (d, J=2.8 Hz, 1H), 7.57 (dd, J=2.8, 8.2 Hz, 1H), 7.46-7.37 (m, 5H), 5.86 (d, J=4.6 Hz, 1H), 5.62 (t, J=7.8 Hz, 1H), 5.30 (q, J=12.3 Hz, 2H), 4.02 (s, 3H), 3.01 (dd, J=8.5, 12.9 Hz, 1H), 2.21-2.13 (m, 1H); LCMS m/z=349.2 [M+H]$^+$.

Step 2: Synthesis of Compound A-2-3

Compound A-2-2 (50 g, 143.54 mmol, 1 eq) was added to methanol (250 mL), and the mixture was stirred, cooled to 0° C.; and sodium borohydride (6.79 g, 179.43 mmol, 1.25 eq) was added in batches, then the internal temperature was controlled at 0 to 10° C.; the mixture was stirred and reacted at 20° C. for 60 minutes after the addition was completed. After the reaction was completed, 100 mL of saturated ammonium chloride solution was added to the reaction solution to quench the reaction, then 50 mL of water was added, and the reaction solution was extracted with methyl tert-butyl ether for three times, 200 mL each time. The organic phases were combined, washed once with 300 mL of saturated sodium chloride, dried with anhydrous sodium sulfate, filtered, and the filtrate was concentrated under vacuum at 45° C. to obtain compound A-2-3. $^1$H NMR (400 MHz, CDCl$_3$) δ: 7.89 (d, J=2.8 Hz, 1H), 7.68 (br s, 1H), 7.66 (dd, J=2.8, 8.4 Hz, 1H), 7.42-7.27 (m, 5H), 5.52 (dd, J=4.8, 10.8 Hz, 1H), 5.27-5.07 (m, 2H), 4.01-3.84 (m, 1H), 3.88 (s, 3H), 3.82-3.70 (m, 1H), 2.29-2.07 (m, 2H); LCMS m/z=351.1[M+H]$^+$.

Step 3: Synthesis of Compound A-2-4

Compound A-2-3 (49 g, 139.86 mmol, 1 eq) was dissolved in THF (250 mL), and triphenylphosphine (44.02 g, 167.84 mmol, 1.2 eq) was added to the reaction solution, and diisopropyl azodicarboxylate (42.42 g, 209.80 mmol, 40.79 mL, 1.5 eq) was added dropwise at 0° C., controlling the reaction temperature to 0 to 10° C., and the mixture was stirred and reacted continuously at 0 to 10° C. for 0.5 hours. After the reaction was completed, the reaction solution was concentrated under vacuum at 45° C. The concentrate was stirred and slurried with a mixed solvent of methyl tert-butyl ether and n-heptane (100 mL; the volume ratio of methyl tert-butyl ether to n-heptane was 1:1) for 0.5 hours, filtered, and the filtrate was concentrated under vacuum to obtain a crude product. The crude product was separated and purified by silica gel column chromatography (gradient elution:n-heptane:ethyl acetate=100:0 to 92:8) to obtain compound A-2-4. $^1$H NMR (400 MHz, CDCl$_3$) δ:7.90 (d, J=3.0 Hz, 1H), 7.50 (dd, J=2.4, 8.4 Hz, 1H), 7.42-7.32 (m, 5H), 5.44 (dd, J=5.2, 8.6 Hz, 1H), 5.31-5.18 (m, 2H), 4.20-4.09 (m, 1H), 3.96 (s, 3H), 3.95-3.83 (m, 1H), 2.97-2.80 (m, 1H), 2.23-2.09 (m, 1H); LCMS m/z=333.2[M+H]$^+$. SFC (column: ChiralpakAD-3, 3 μm, 0.46 cm id×5 cm L; mobile phase: A (CO$_2$) and B (isopropanol, containing 0.05% diethylamine); gradient: B %=5-40%, 2 min, holding at 40%, 1.2 min, then 5%, 0.8 min; flow rate: 4 mL/min; wavelength: 220 nm; pressure: 1500 psi; retention time: 0.887 min, ee %=98.94%.

Step 4: Synthesis of Compound A-2

After compound A-2-4 (35 g, 105.32 mmol, 1 eq) was dissolved in dichloromethane (175 mL), then hydrobromic acid/acetic acid solution (68 mL, 413.24 mmol, mass fraction was 33%, 3.92 eq) was added thereto. After stirring and reacting at 25° C. for 5 days, an additional hydrobromic acid/acetic acid solution (51 mL, 3.0 eq) was added, and the reaction was continued for 1 day. Under the protection of nitrogen, the reaction solution was filtered under reduced pressure. After the filter cake was washed with 30 mL of methyl tert-butyl ether, the filter cake was dried under vacuum to obtain compound A-2 (identified by ion chromatography, the Br content was consistent with two salts). $^1$H NMR (400 MHz, CD$_3$OD) δ:7.93 (dd, J=2.4, 7.8 Hz, 1H), 7.69 (t, J=3.2 Hz, 1H), 5.13 (t, J=8.4 Hz, 1H), 4.59 (dt, J=3.6, 7.8 Hz, 1H), 4.41 (dt, J=6.0, 8.5 Hz, 1H), 3.00-2.89 (m, 1H), 2.87-2.73 (m, 1H); LCMS m/z=185.0[M+H]$^+$. SFC (column: Chiralpak AD-3, 3 μm, 0.46 cm id×5 cm L; mobile phase: A (CO$_2$) and B (isopropanol, containing 0.05% diethylamine); gradient: B %=5-40%, 5 min, then 40-5%, 0.5 min, and finally holding at 5%, 1.5 min; flow rate: 2.5 mL/min; wavelength: 220 nm; pressure: 1500 psi; retention time: 3.624 min, ee %=98.32%.

Embodiment 1: Synthesis of Compound WX-001

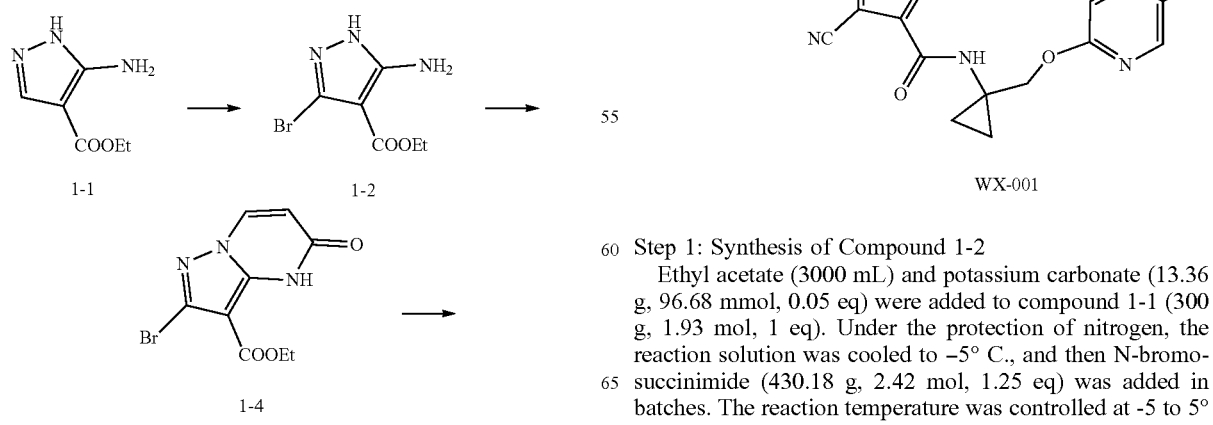

Step 1: Synthesis of Compound 1-2

Ethyl acetate (3000 mL) and potassium carbonate (13.36 g, 96.68 mmol, 0.05 eq) were added to compound 1-1 (300 g, 1.93 mol, 1 eq). Under the protection of nitrogen, the reaction solution was cooled to −5° C., and then N-bromosuccinimide (430.18 g, 2.42 mol, 1.25 eq) was added in batches. The reaction temperature was controlled at -5 to 5° C. with a feeding time of 2.5 hours, and then the mixture was stirred for 16 hours at room temperature (20° C.). Aqueous sodium sulfite solution (prepared by 400 g of anhydrous sodium sulfite and 2300 mL of water) was added to the reaction solution, and the mixture was continuously stirred for 10 minutes. The phases were separated, and the organic phase was washed once with 1000 mL of saturated brine. The organic phases and the aqueous phases obtained by the same treatment of this batch and another parallel batch reaction (same scale: 300 g of compound 1-1) were respectively combined for treatment. The aqueous phase (suspension) of the first separation was filtered, and the filtrate was extracted twice with ethyl acetate (1500 mL each time), and the combined organic phase was washed once with 2000 mL of saturated brine. All organic phases were combined, dried with anhydrous sodium sulfate, filtered, and the filter cake was washed with ethyl acetate (500 mL). The filtrate was concentrated under vacuum at 45° C. to obtain 880 g of solid crude product; the crude product was stirred and slurried with methanol (3960 mL) for 16 hours, filtered, and the filter cake was washed with methanol (300 mL), and the filtrate was concentrated under vacuum at 45° C. to obtain 780 g of crude product. The crude product was stirred and slurried with methyl tert-butyl ether (780 mL) at room temperature for 3 hours, filtered, and the filter cake was dried under vacuum to obtain compound 1-2. $^1$H NMR (400 MHz, CDCl$_3$) δ: 5.33 (br s, 2H), 4.26 (q, J=7.0 Hz, 2H), 1.32 (t, J=7.2 Hz, 3H); LCMS m/z=233.8[M+1]$^+$.

Step 2: Synthesis of Compound 1-4

Compound 1-2 (294 g, 1.26 mol, 1 eq) and potassium phosphate (399.95 g, 1.88 mol, 1.5 eq) were sequentially added to N,N-dimethylformamide (2250 mL), stirred, and then ethyl 3-ethoxyacrylate (181.10 g, 1.26 mol, 181.46 mL, 1 eq) was added thereto, and the mixture was heated to 125° C. and reacted for 8 hours. After cooling to room temperature, 600 mL of cold water was added to the reaction solution, stirred for 5 minutes, then ice (2000 mL) was added to the reaction solution. Hydrochloric acid solution (3 M, 2000 mL) was slowly added thereto while stirring, and the pH was adjusted to 2; the mixture was stirred for 10 minutes, and then filtered. The filter cake was stirred and slurried with water (1000 mL) for 10 minutes, then filtered, and the obtained filter cake was stirred and slurried with methanol (1000 mL) for 20 minutes. After filtration, the filter cake was washed with methanol (200 mL) and dried under vacuum at 45° C. to obtain compound 1-4. $^1$H NMR (400 MHz, CDCl$_3$) δ: 9.76 (br s, 1H), 7.97 (d, J=8.0 Hz, 1H), 6.09 (d, J=8.0 Hz, 1H), 4.34 (q, J=7.2 Hz, 2H), 1.35 (t, J=7.2 Hz, 3H).

Step 3: Synthesis of Compound 1-11

Compound 1-4 (50 g, 145.06 mmol, 1 eq) and cuprous cyanide (32.48 g, 362.66 mmol, 2.5 eq) were added to N,N-dimethylformamide (250 mL), and then the mixture was heated to 125° C. to react for 60 hours. After the reaction was completed, the reaction solution was cooled to room temperature, poured into water (500 mL) and stirred for 2 hours. The mixture solution was filtered under reduced pressure and the filter cake was collected, and the filter cake was dried under vacuum to obtain compound 1-11. $^1$H NMR (400 MHz, DMSO-d$_6$) δ: 12.28 (br s, 1H), 8.68 (br d, J=8.0 Hz, 1H), 6.41 (br d, J=8.0 Hz, 1H), 4.34 (q, J=6.8 Hz, 2H), 1.31 (t, J=7.0 Hz, 3H).

Step 4: Synthesis of Compound 1-12

Compound 1-11 (34 g, 146.43 mmol, 1 eq), triethylamine (44.45 g, 439.29 mmol, 3 eq) and 4-dimethylaminopyridine (3.58 g, 29.29 mmol, 0.2 eq) were sequentially added to dichloromethane (300 mL), and the system was replaced with nitrogen. Then, a dichloromethane (100 mL) solution of p-toluenesulfonyl chloride (69.79 g, 366.07 mmol, 2.5 eq) was added dropwise at 0° C. After the addition was completed, the reaction solution was slowly raised to room temperature of 20° C. to react for 6 hours. After the reaction was completed, the reaction solution was poured into water (1500 mL), and then dichloromethane (2500 mL) was added thereto, and the mixture was stirred for 1 hour, and then left to stand for liquid separation. After adding water (1500 mL) to the organic phase, the mixture was stirred for 1 hour, left to stand for liquid separation, and the aqueous phase was discarded. After adding dichloromethane (1500 mL) to the aqueous phase of the first liquid separation, the mixture was stirred for 1 hour and left to stand for liquid separation. The organic phases of the two liquid separations were combined, dried with anhydrous sodium sulfate, filtered, and the filtrate was concentrated under vacuum to obtain a crude product. The crude product was slurried and stirred with methanol (150 mL) at room temperature of 20° C. for 2 hours. After filtration, the filter cake was washed with a small amount of methanol (3 mL), and the filter cake was dried under vacuum to obtain compound 1-12. $^1$H NMR (400 MHz, CDCl$_3$) δ: 8.68 (d, J=7.2 Hz, 1H), 8.36 (d, J=8.0 Hz, 2H), 7.43 (d, J=8.0 Hz, 2H), 6.87 (d, J=7.6 Hz, 1H), 4.54 (q, J=7.0 Hz, 2H), 2.48 (s, 3H), 1.52 (t, J=7.2 Hz, 3H); LCMS m/z=387.0[M+1]*.

Step 5: Synthesis of Compound 1-14

Compound A-2 (1.0 g, 2.89 mmol, 1 eq) was added to isopropanol (10 mL), then compound 1-12 (893.39 mg, 2.31 mmol, 0.80 eq) was added thereto, and finally N,N-diisopropylethylamine (1.12 g, 8.67 mmol, 1.51 mL, 3 eq) was added thereto, and the mixture was stirred at 40° C. for 3 hours. After the reaction was completed, the reaction system was cooled to room temperature, filtered to obtain a filter cake, and the filter cake was slurried with ethyl acetate (2 mL) at room temperature for 30 minutes, and then filtered to obtain compound 1-14. $^1$HNMR (400 MHz, DMSO-d$_6$) δ: 8.95 (d, J=7.6 Hz, 1H), 7.53 (s, 1H), 7.20 (s, 1H), 7.13 (d, J=8.0 Hz, 1H), 5.57-5.53 (m, 1H), 4.24-4.16 (m, 3H), 4.02-3.96 (m, 1H), 2.84-2.67 (m, 1H), 2.29-2.21 (m, 1H), 1.18 (t, J=7.2 Hz, 3H); LCMS m/z=399.1[M+1]$^+$.

Step 6: Synthesis of Compound 1-15

Compound 1-14 (8.7 g, 21.84 mmol, 1 eq) was dissolved in a mixed solution of water (22 mL) and tetrahydrofuran (65 mL), and then lithium hydroxide monohydrate (3.67 g, 87.36 mmol, 4 eq) was added, and the system was replaced with nitrogen. The reaction system changed from turbid to clear, and stirred at 25° C. for 4 hours. The reaction solution was adjusted to pH=6-7 with 1M hydrochloric acid solution (15 mL), and a solid was precipitated. The system was filtered with a funnel, and the filter cake was washed twice with 4 mL of water each time. The filter cake was dried under vacuum to obtain compound 1-15. LCMS m/z=371.0 [M+H]$^+$. SFC (column: ChiralpakAD-3, 3 μm, 0.46 cm id×5 cm L; mobile phase: A (CO$_2$) and B (EtOH, containing 0.05% diethylamine); gradient: B %=5-50%, 3 min; flow rate: 3.4 mL/min; wavelength: 220 nm; pressure: 100 bar; retention time: 1.68 min, ee %=100%.

Step 7: Synthesis of Compound 1-16

Compound 1-15 (33.4 g, 90.20 mmol, 1 eq) and 1-aminocyclopropane methanol hydrochloride (12.26 g, 99.22 mmol, 1.1 eq, HCl) were dissolved in N,N-dimethylformamide (334 mL), and the system was replaced with nitrogen, and then HATU (37.73 g, 99.22 mmol, 1.1 eq) was added. The system was replaced with nitrogen again, and N,N-diisopropylethylamine (46.63 g, 360.79 mmol, 62.84 mL, 4 eq) was added. The reaction system changed from white turbidity to yellow clarification and then to yellow turbidity, and stirred at 25° C. for 3.5 hours. Saturated ammonium chloride solution (3.34, 0.1 V) was added to the reaction system, and then acetonitrile (133.6 mL, 4 V) was added thereto; the mixture was stirred for 30 minutes and filtered through a Buchner funnel, and the filter cake was washed with acetonitrile for three times, 10 mL each time. The filter cake was collected, and the filter cake was dried under vacuum to obtain compound 1-16. $^1$HNMR (400 MHz, DMSO-$d_6$) δ: 11.86 (s, 1H), 8.98 (d, J=7.6 Hz, 1H), 7.70 (s, 1H), 7.60 (s, 1H), 7.46-7.43 (m, 1H), 7.11 (d, J=8.0 Hz, 1H), 5.42 (t, J=6.8, 1H), 4.59-4.58 (m, 1H), 4.34-4.30 (m, 1H), 4.08-4.03 (m, 1H), 3.47-3.38 (m, 2H), 3.03-2.95 (m, 1H), 2.25-2.18 (m, 1H), 0.74-0.68 (m, 2H), 0.60-0.57 (m, 1H), 0.35-0.32 (m, 1H); LCMS m z=440.1 [M+H]f. SFC (column: (S,S)-WHELK-01, 3.5 μm, 0.46 cm id×5 cm L; mobile phase: A ($CO_2$) and B (EtOH, containing 0.05% DEA); gradient: B %=5-50%, 3 min; flow rate: 3.4 mL/min; wavelength: 220 nm; column temperature: 35° C.; column pressure: 1800 psi, retention time: 1.65 min, ee %=100%.

Step 8: Synthesis of Compound WX-001

Compound 1-16 (45 g, 102.41 mmol, 1 eq) was dissolved in tetrahydrofuran (450 mL), and after the system was replaced with nitrogen, tri-n-butylphosphine (41.44 g, 204.83 mmol, 50.54 mL, 2 eq) was added thereto, then azodicarbonyl dipiperidine (51.68 g, 204.83 mmol, 2 eq) was added thereto; the mixture was reacted at 20° C. for 3 hours. After the reaction system was combined with the other two batches of reaction systems (4.45 g+5 g), methanol (220 mL, 4 V) was added to the system; and after stirring for 30 minutes, the filter cake solid was obtained by filtration, and then the filter cake solid was slurried with methanol (165 mL, 5V) for three times at room temperature and filtered after stirring for 30 minutes each time. The filter cake was collected, and the filter cake was dried under vacuum to obtain compound WX-001. $^1$HNMR (400 MHz, DMSO-$d_6$) δ: 9.26 (s, 1H), 8.98 (d, J=8.0 Hz, 1H), 8.16 (d, J=2.8 Hz, 1H), 7.89 (dd, J=8.4 Hz, 2.8 Hz, 1H), 7.04 (d, J=8.0 Hz, 1H), 5.97 (t, J=8.4, 1H), 4.76 (d, J=10.8 Hz, 1H), 4.59 (t, J=7.2 Hz, 1H), 4.02-3.99 (m, 1H), 3.91 (d, J=10.8 Hz, 1H), 3.07-3.01 (m, 1H), 2.63-2.57 (m, 1H), 2.13-2.08 (m, 1H), 1.28-1.24 (m, 1H), 0.98-0.89 (m, 2H); LCMS m/z=422.1 [M+H]$^+$. SFC (column: Chiralcel OD-3, 3 μm, 0.46 cm id×5 cm L; mobile phase: A ($CO_2$) and B (MeOH, containing 0.05% isopropylamine); gradient: B %=10-40%, 3 min; flow rate: 4.0 mL/min; wavelength: 220 nm; pressure: 100 bar; retention time: 2.03 min, ee %=100%.

Embodiment 2: Synthesis of Compound WX-002A and WX-002B

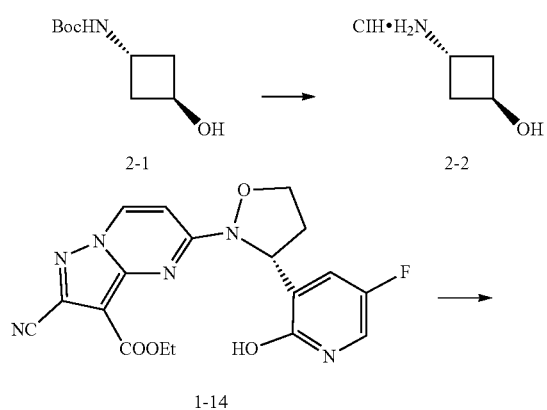

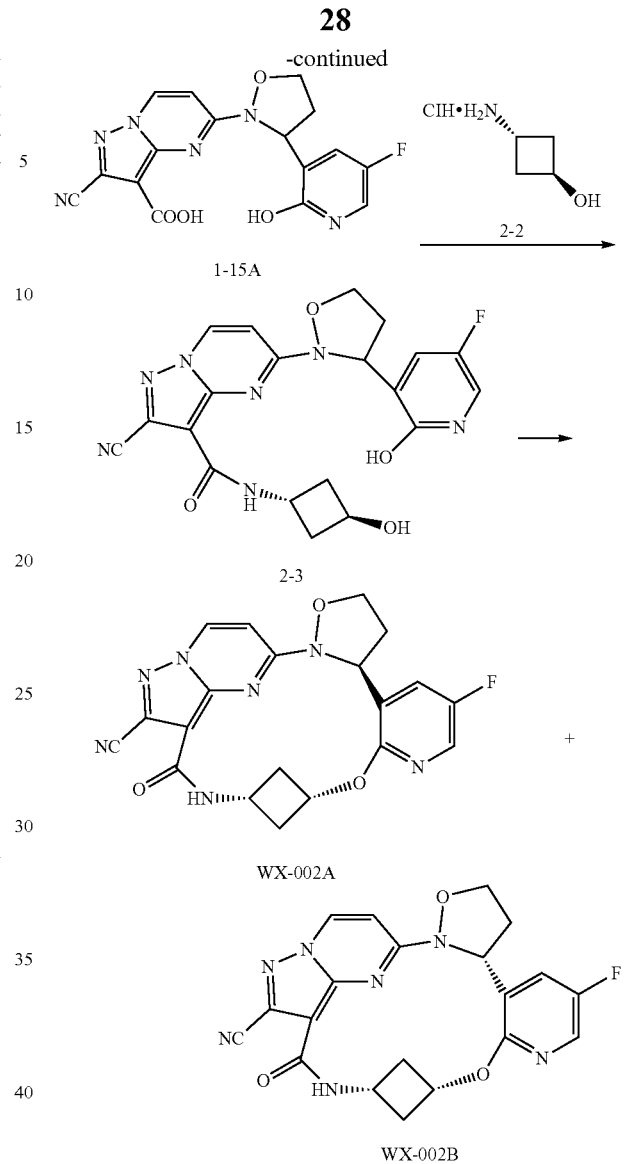

Step 1: Synthesis of Compound 2-2

Compound 2-1 (0.2 g, 1.07 mmol, 1 eq) was dissolved in ethyl acetate (0.5 mL), then hydrochloric acid/ethyl acetate (2 mL, 4 M) was added thereto, and the mixture was reacted at room temperature of 20° C. for 10 minutes. The reaction solution was concentrated under reduced pressure at 45° C. to obtain compound 2-2 (crude product). $^1$HNMR (400 MHz, DMSO-$d_6$) δ: 8.34 (br s, 3H), 5.12 (br s, 1H), 4.47-4.40 (m, 1H), 3.68-3.60 (m, 1H), 2.35-2.27 (m, 2H), 2.15-2.09 (m, 2H).

Step 2: Synthesis of Compound 1-15A

Compound 1-14 (1.4 g, 3.51 mmol, 1 eq) was dissolved in acetonitrile (70 mL), then aluminum oxide (1.47 g, 14.41 mmol, 4.1 eq) and potassium trimethylsiliconate (901.76 mg, 7.03 mmol, 2 eq) were added thereto, and system was replaced with nitrogen, heated to 80° C. and stirred for 3 hours. After an additional potassium trimethylsiliconate (90.18 mg, 0.703 mmol, 0.2 eq) was added, stirring was continued at 80° C. for 1 hour. After cooling to room temperature, the reaction system was filtered, and the filter cake was washed twice with acetonitrile, 1.0 mL each time, and the obtained filter cake was the crude product. The crude product was slurried with a mixed solvent (17.5 mL of acetonitrile and 3.5 mL of methanol) at room temperature, filtered, and the filter cake was dried under vacuum to obtain compound 1-15A. LCMS m z=371.0 [M+H]$^+$. SFC (column: ChiralpakAD-3, 3 μm, 0.46 cm id×5 cm L; mobile phase: A (CO$_2$) and B (EtOH, containing 0.05% diethylamine); gradient: B %=5-50%, 3 min; flow rate: 3.4 mL/min; wavelength: 220 nm; pressure: 100 bar; retention time: 1.68 min. ee %=79.56%, indicating that the product was partially racemic under this condition.)

Step 3: Synthesis of Compound 2-3

Compound 1-15A (570 mg, 769.66 μmol, 1 eq) was dissolved in N,N-dimethylformamide (12 mL), and then HATU (234.12 mg, 615.73 μmol, 0.8 eq), compound 2-2 (73.76 mg, 596.84 μmol, HCl) and N,N-diisopropylethylamine (298.41 mg, 2.31 mmol, 3 eq) were added, and the reaction solution was reacted at room temperature of 20° C. for 1 hour. After adding 2 drops of water to the reaction system to quench the reaction, the reaction solution was concentrated under vacuum at 45° C. to obtain a residue. The residue was separated and purified by silica gel column chromatography (eluent:dichloromethane:methanol=100:0-90:10) to obtain compound 2-3. LCMS m/z=440.1 [M+H]$^+$.

Step 4: Synthesis of Compounds WX-002A and WX-002B

Compound 2-3 (70 mg, 159.31 μmol, 1 eq) was dissolved in tetrahydrofuran (3 mL), and then triphenylphosphine (125.36 mg, 477.93 μmol, 3 eq) and diisopropyl azodicarboxylate (96.64 mg, 477.93 μmol, 3 eq) were added sequentially, and the mixture was stirred and reacted at room temperature of 20° C. for 1 hour after the addition was completed. After adding 2 drops of water to the reaction system to quench the reaction, the reaction solution was concentrated under vacuum to obtain the residue. The residue was purified by silica gel column chromatography (the eluent was dichloromethane:methanol=100: 0-90:10) to obtain a crude product. The above crude product was slurried and stirred with a mixed solution of 1 mL of dichloromethane and 1 mL of methanol for 10 minutes, and the mixture was filtered, and then the filter cake was dried under vacuum to obtain a product. The product was resolved by SFC (chromatographic column: REGIS (s,s) WHELK-O1 (250 mm*50 mm, 10 m); mobile phase: A: CO$_2$; B: [MeOH with 0.1% ammonia]; gradient B %: 53%-53%). Compound WX-002A and compound WX-002B were obtained.

WX-002A: $^1$HNMR (400 MHz, CDCl$_3$) δ: 9.14 (d, J=10.4 Hz, 1H), 8.42 (d, J=8.0 Hz, 1H), 7.98 (d, J=2.8 Hz, 1H), 7.59-7.56 (m, 1H), 7.05 (d, J=7.2 Hz, 1H), 6.15 (t, J=8.0 Hz, 1H), 5.29-5.26 (m, 1H), 4.97-4.90 (m, 1H), 4.56 (t, J=8.0 Hz, 1H), 3.98-3.91 (m, 1H), 3.15-3.05 (m, 2H), 3.02-2.96 (m, 1H), 2.55-2.45 (m, 1H), 2.27-2.22 (m, 1H), 1.92-1.87 (m, 1H); LCMS m/z=422.1 [M+H]$^+$. SFC (column: REGIS (s,s) WHELK-O1 (50 mm*4.6 mm, 3 m); mobile phase: A: CO$_2$; B: [MeOH with 0.05% diethylamine]; after the gradient B % was increased from 5% to 50% in 1.2 min, holding B %=50% for 1 min, and then decreased from 50% to 5% in 0.8 min); flow rate: 3.4 mL/min; temperature: 35° C.; pressure: 100 bar; retention time: 2.243 min, ee %=97.60%.

WX-002B: $^1$HNMR (400 MHz, CDCl$_3$) δ: 9.14 (d, J=10.4 Hz, 1H), 8.42 (d, J=8.0 Hz, 1H), 7.98 (d, J=3.2 Hz, 1H), 7.59-7.56 (m, 1H), 7.05 (d, J=7.2 Hz, 1H), 6.15 (t, J=8.0 Hz, 1H), 5.30-5.26 (m, 1H), 4.97-4.92 (m, 1H), 4.56 (t, J=7.6 Hz, 1H), 3.97-3.91 (m, 1H), 3.15-3.05 (m, 2H), 3.02-2.96 (m, 1H), 2.55-2.45 (m, 1H), 2.27-2.22 (m, 1H), 1.92-1.87 (m, 1H); LCMS m/z=422.2 [M+H]$^+$. SFC (column: REGIS (s,s) WHELK-O1 (50 mm*4.6 mm, 3 m); mobile phase: A: CO$_2$; B: [MeOH with 0.05% diethylamine]; after the gradient B % was increased from 5% to 50% in 1.2 min, holding B %=50% for 1 min, and then decreased from 50% to 5% in 0.8 min); flow rate: 3.4 mL/min; temperature: 35° C.; pressure: 100 bar; retention time: 2.440 min, ee %=95.98%.

Embodiment 3: Synthesis of Compound WX-003

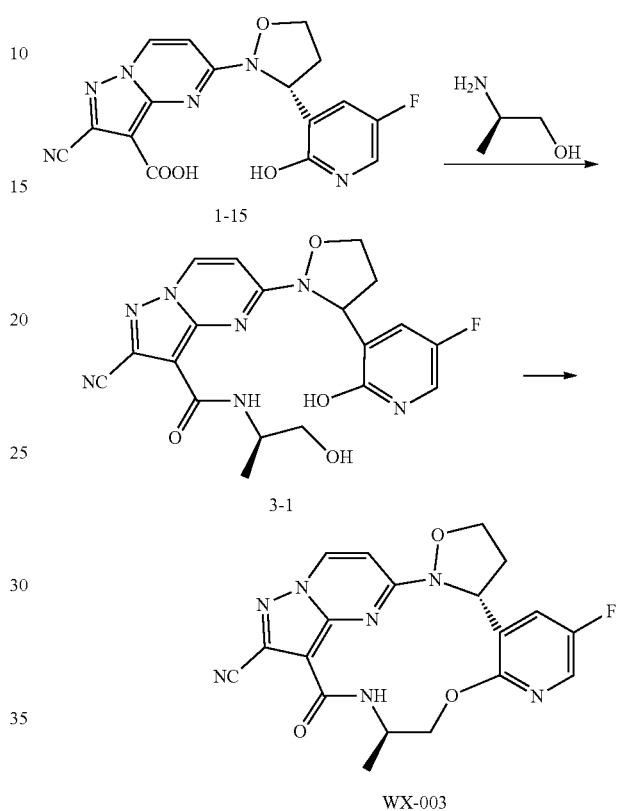

Step 1: Synthesis of Compound 3-1

Compound 1-15 (200.0 mg, 489.73 μmol, 1 eq) and (R)-(−)-2-amino-1-propanol (36.78 mg, 489.73 μmol, 1 eq) were dissolved in N,N-dimethylformamide (4 mL), and HATU (148.97 mg, 391.79 μmol, 0.8 eq) was added thereto. Then diisopropylethylamine (189.88 mg, 1.47 mmol, 3 eq) was added under the atmosphere of nitrogen. After the addition was completed, the reaction solution was stirred at 25° C. for 9 hours. The reaction solution was directly concentrated under vacuum to obtain a residue, and the residue was separated and purified by silica gel column chromatography (eluent: methanol:dichloromethane=0 to 1:1) to obtain compound 3-1. LCMS m/z=428.1 [M+H]$^+$.

Step 2: Synthesis of Compound WX-003

Compound 3-1 (67 mg, 156.77 μmol, 1 eq) was dissolved in dichloromethane (2 mL), then triphenylphosphine (123.35 mg, 470.30 μmol, 3 eq) was added thereto. After the system was replaced with nitrogen, diethyl azodicarboxylate (81.90 mg, 470.30 μmol, 3 eq) was added, and the mixture was stirred at 25° C. for 7 hours after the addition was completed. After 3 drops of water were dropped into the reaction solution to quench the reaction, the reaction solution was concentrated under vacuum, and the concentrated residue was separated and purified by preparative thin layer chromatography on silica gel plate (developing agent:ethyl acetate) to obtain compound WX-003. $^1$HNMR (400 MHz, CDCl$_3$) δ: 9.53 (d, J=7.2 Hz, 1H), 8.39 (d, J=7.6 Hz, 1H), 7.98 (d, J=2.8 Hz, 1H), 7.57-7.54 (m, 1H), 6.95 (d, J=7.6 Hz, 1H), 6.04-6.00 (m, 1H), 4.69 (dd, J=10.8, 4.0 Hz, 1H), 4.61-4.57 (m, 1H), 4.48-4.45 (m, 1H), 4.31-4.25 (m, 1H), 4.04-3.97 (m, 1H), 3.14-3.07 (m, 1H), 2.64-2.55 (m, 1H), 1.53 (d, J=6.4 Hz, 3H); LCMS m z=410.1 [M+H]$^+$.

Test Data

Experimental Embodiment 1: Kinase Inhibitory Activity of Compounds on TrkA and ROS1

The kinase inhibitory activity of compounds on TrkA and ROS1 was tested by Reaction Biology Corp. Company. A certain concentration of substrate, coenzyme factor, kinase and test compounds (10 doses, 3-fold serial dilution, 2% DMSO final concentration) were sequentially added to the reaction buffer (20 mM Hepes (pH 7.5), 10 mM MgCl$_2$, 1 mM EGTA, 0.02% Brij35, 0.02 mg/mL BSA, 0.1 mM Na$_3$VO$_4$, 2 mM DTT, 1% DMSO) and mixed well. The mixture was incubated at room temperature for 20 minutes. A certain concentration of $^{33}$P-ATP was added to the reaction mixture to start the reaction, and then incubated at room temperature for 120 minutes. Finally, the radioactivity of reactants was detected by filter-binding method. The final kinase activity was expressed as the ratio of the remaining kinase activity in the test sample to the kinase activity of DMSO control group. The dose-effect curve was fitted by GraphPad software and IC$_{50}$ was calculated. The results are shown in Table 1:

TABLE 1

Kinase half inhibitory concentration IC$_{50}$ (nM)

|   | Compound | ROS1 | ROS1-G2032R | TrkA | ALK |
|---|---|---|---|---|---|
| 1 | TPX-0005 | 0.2 | 0.2 | 3.7 | 2.3 |
| 2 | WX-001 | 0.8 | 0.3 | 231.0 | 103 |
| 4 | WX-002B | 0.2 | 0.1 | 597 | 25.1 |
| 5 | WX-003 | 1.6 | 0.7 | 435 | 136 |

The results showed that the compound of the present disclosure showed high kinase inhibitory activity on a ROS1 kinase and a mutant ROS1-G2032R thereof, which was comparable to the activity of TPX-0005. However, the compound of the present disclosure had weak inhibitory activity on TrkA and ALK kinases, showing high selectivity, which was significantly better than that of TPX-0005.

Experimental Embodiment 2: Inhibitory Activity of Compounds on Cell Proliferation Adenosine Tri-Phosphate (ATP) is an energy carrier shared by all kinds of life activities in nature, and it is the smallest unit of energy storage and transfer. The CellTiter-Glo™ living cell test reagent kit uses luciferase as the detector, and luciferase requires the participation of ATP in the process of luminescence. CellTiter-Glo™ reagent was added to a cell culture medium, and the luminescence value was measured. The light signal was directly proportional to the amount of ATP in the system, and ATP was positively correlated with the number of living cells. Therefore, cell proliferation can be detected by detecting ATP content with the CellTiter-Glo kit. In this test, the cell lines were Ba/F3 SLC34A2-ROS1-WT, Ba/F3 SLC34A2-ROS1-G2032R, Ba/F3 LMNA-NTRK1-WT stably transfected cell lines, with a number of 5000 cells/well.

IC$_{50}$ Determination Process:

1 Cell Culture and Inoculation
  a) Cells in logarithmic growth phase were harvested and counted using a platelet counter. Cell viability was detected by trypan blue exclusion method to ensure that the cell viability was above 90%.
  b) Cell concentration was adjusted; 90 µL of cell suspension was added to a 96-well plate respectively.
  c) Cells in the 96-well plate were cultured overnight at 37° C., 5% CO$_2$, and 95% humidity.

2 Drug Dilution and Dosing
  a) A 10-fold drug solution was prepared with a maximum concentration of 10 µM, 9 concentrations and 3-fold dilution; 10 µL of drug solution was added to each well in the 96-well plate seeded with cells, and three duplicate wells were set for each drug concentration.
  b) Cells in the dosed 96-well plate were incubated at 37° C., 5% CO$_2$, and 95% humidity for a further 72 hours, and then CTG analysis was performed.

3 End-Point Plate Reading
  a) CTG reagent was melt and the cell plate was equilibrated to room temperature for 30 minutes.
  b) An equal volume of CTG solution was added to each well.
  c) Cells were lysed by shaking on an orbital shaker for 5 minutes.
  d) The cell plate was placed at room temperature for 20 minutes to stabilize the luminescent signal.
  e) The luminescence value was read.

4 Data Processing
  The data were analyzed using GraphPad Prism 5.0 software, and a dose-effect curve was obtained by fitting the data using a nonlinear S-curve regression, from which IC$_{50}$ values were calculated. The data are shown in Table 2.

TABLE 2

Cell half inhibitory concentration IC$_{50}$ (nM)

|   | Compound | Ba/F3 SLC34A2-ROS1 | Ba/F3 SLC34A2-ROS1-G2032R | Ba/F3 LMNA-NTRK1-WT |
|---|---|---|---|---|
| 1 | TPX-0005 | 1.9 | 13.0 | 1.1 |
| 2 | WX-001 | 4.6 | 5.6 | 37.0 |
| 3 | WX-002B | 24 | 20 | 157 |
| 4 | WX-003 | 11 | 9.3 | 43 |

The results showed that the compounds of the present disclosure showed high cell proliferation inhibitory activity on the ROS1-fused cell line Ba/F3 SLC34A2-ROS1 and the mutant cell line Ba/F3 SLC34A2-ROS1-G2032R thereof. Meanwhile, the compounds of the present disclosure showed weak inhibitory activity on the Ba/F3 LMNA-NTRK1-WT cell line, and compared with Ba/F3 SLC34A2-ROS1 cell line and Ba/F3 SLC34A2-ROS1-G2032R cell line, especially Ba/F3 SLC34A2-ROS1-G2032R cell line, showing significant inhibitory selectivity.

Experimental Embodiment 3: Cassette Pharmacokinetics Test of Compounds in Mice Experimental objective: To study the pharmacokinetic behavior of the compounds of the present disclosure in mice, and evaluate its pharmacokinetic characteristics by taking 7-9 week-old male CD-1 mice as the test animals and using a LC/MS/MS method to determine the drug concentration of the compounds in plasma at different time after single intravenous injection (IV) and gavage (PO) administration.

Drug preparation: Compounds were formulated into clear solutions with 5% DMSO+10% solutol+85% water as the solvent for IV (intravenous) and PO (gavage) group administration. The dosing method was cassette dosing, and the dosage of each compound was IV 0.5 mg/kg; the dosage of PO was 2.5 mg/kg. The results of pharmacokinetic parameters are shown in Table 3:

TABLE 3

Results of cassette pharmacokinetic tests in mice

| | | Crizotinib | Entrectinib | Lorlatinib | TPX-0005 | WX-001 |
|---|---|---|---|---|---|---|
| IV@ 0.5 mpk | Starting concentration $C_0$ (nM) | 776 | 1280 | 905 | 936 | 994 |
| | Half-life $T_{1/2}$ (h) | 2.54 | 2.52 | 2.39 | 4.38 | 1.66 |
| | Apparent volume of distribution Vd (L/kg) | 4.93 | 1.39 | 1.79 | 5.26 | 0.551 |
| | Apparent clearance rate Cl (mL/Kg/min) | 30.3 | 6.83 | 9.96 | 18.0 | 3.43 |
| | Area under curve $AUC_{0\text{-}last}$ (nM · hr) | 562 | 1912 | 1896 | 1282 | 5645 |
| PO@ 2.5 mpk | Peak concentration $C_{max}$ (nM) | 311 | 690 | 3225 | 3360 | 5380 |
| | Peak time $T_{max}$ (h) | 2.00 | 2.00 | 0.500 | 0.500 | 0.500 |
| | Area under curve $AUC_{0\text{-}last}$ (nM · hr) | 1838 | 4363 | 13537 | 10602 | 25273 |
| | Bioavailability F % | 65.4% | 45.7% | 143% | 166% | 89.8% |
| | Drug concentration in brain at 0.5 hours Brain@0.5 h (nmol/kg) | ND | 12.7 | 622 | 42.2 | 486 |
| | Drug concentration in brain at 2 hours Brain@2 h (nmol/kg) | 20.8 | 38.9 | 896 | 86.2 | 664 |
| | Drug concentration in cerebrospinal fluid at 0.5 hours CSF@0.5 h (nmol/kg) | ND | ND | 105 | 5.46 | 26.9 |
| | Drug concentration in cerebrospinal fluid at 2 hours CSF@2 h (nmol/kg) | ND | ND | 145 | ND | 36.4 |
| | Drug concentration in lung at 0.5 hours Lung@0.5 h (nmol/kg) | 693 | 876 | 1344 | 1131 | 1770 |
| | Drug concentration in lung at 2 hours Lung@2 h (nmol/kg) | 5088 | 5958 | 2016 | 1434 | 2862 |

"ND": Not detected.

The results showed that: at the same dosage, the total systemic exposure and peak concentration of compound WX-001 of the present disclosure after oral administration were significantly higher than those of Crizotinib, Entretinib, Lorlatinib and TPX-005, and its apparent clearance rate was significantly lower than those of Crizotinib, Entretinib, Lorlatinib and TPX-005, showing excellent pharmacokinetic characteristics. Compared with Entrectinib and Lorlatinib, the concentration of the compound of the present disclosure in brain and cerebrospinal fluid was significantly higher than that of Entrectinib and comparable to Lorlatinib after 0.5 hours and 2 hours of administration. Compared with TPX-0005, the concentrations of the compound of the present disclosure in lung, brain and cerebrospinal fluid were significantly higher at two time points after 0.5 hours and 2 hours of administration.

Experimental Embodiment 4: Pharmacokinetic Test of the Compounds in Mice

Experimental objective: To study the pharmacokinetic behavior of the compounds of the present disclosure in mice, and evaluate its pharmacokinetic characteristics by using 7-9 week-old male CD-1 mice as the test animals and using a LC/MS/MS method to determine the drug concentration of the compounds in plasma at different time after single intravenous injection (IV) and gavage (PO) administration.

Drug preparation: Compounds were formulated into clear solutions with 10% DMSO+10% solutol+80% water as the solvent for IV (intravenous) and PO (gavage) group administration. The dosage of each compound was: IV 1 mg/kg; the dosage of PO was 3 mg/kg. The results of pharmacokinetic parameters are shown in Table 4:

TABLE 4

Results of pharmacokinetic tests in mice

|  |  | WX-002B | WX-003 |
|---|---|---|---|
| IV | Half-life $T_{1/2}$ (h) | 2.1 | 3.2 |
|  | Apparent volume of distribution Vd (L/kg) | 1.1 | 1.0 |
|  | Apparent clearance rate Cl (mL/Kg/min) | 6.3 | 4.0 |
|  | Area under curve $AUC_{0-last}$ (nM · hr) | 5873 | 8665 |
| PO | Peak concentration $C_{max}$ (nM) | 2170 | 3805 |
|  | Peak time $T_{max}$ (h) | 1.5 | 3.0 |
|  | Area under curve $AUC_{0-last}$ (nM · hr) | 13350 | 23771 |
|  | Bioavailability F % | 76% | 92% |

The results showed that: the total systemic exposure, peak concentration and bioavailability of the compounds of the present disclosure after oral administration were all high, showing excellent pharmacokinetic characteristics.

Experimental Embodiment 5: Efficacy Test of the Compounds in Mice

Experimental objective: To evaluate the in vivo efficacy of WX-001 in Ba/F3 CD74-ROS1-WT subcutaneous xenograft tumor BALB/c nude mice model.

Drug preparation: Compounds were formulated into clear solutions with 10% DMSO+10% solutol+80% water as the solvent for PO (gavage) group administration.

Tumor measurement: Diameters of tumors were measured with vernier calipers twice a week. The calculation formula of tumor volume was: $V=0.5 \times a \times b^2$, wherein a and b represented the long and short diameters of the tumor, respectively. The anti-tumor efficacy of the compounds was evaluated by TGI (%) or relative tumor proliferation rate T/C (%). TGI (%) reflects the tumor growth inhibition rate. Relative tumor proliferation rate T/C (%)=$T_{RTV}/C_{RTV} \times 100\%$ ($T_{RTV}$: mean RTV of the treatment group; $C_{RTV}$: mean RTV of the negative control group). The relative tumor volume (RTV) was calculated according to the results of tumor measurement, and the calculation formula was RTV=$V_t/V_0$, wherein $V_0$ was the tumor volume measured at the time of group administration (that is, D0), $V_t$ was the tumor volume of the corresponding mouse at a certain measurement, and the data of $T_{RTV}$ and $C_{RTV}$ were taken on the same day. TGI (%)=[(1−(average tumor volume at the end of administration of a certain treatment group−average tumor volume at the beginning of administration of this treatment group))/(average tumor volume at the end of treatment in the solvent control group−average tumor volume at the beginning of treatment in the solvent control group)]×100%. The results are shown in FIG. 1.

Statistical analysis: Statistical analysis was based on the relative tumor volume and tumor weight at the end of the trial, which was analyzed by SPSS software. The comparison between multiple groups was analyzed by using one-way ANOVA. If the variances were homogeneous (no significant difference in F-values), Tukey's method was used for analysis. If the variances were not homogeneous (significant difference in F-values), Games-Howell method was used for test. P<0.05 was considered as a significant difference.

Experimental results: In the Ba/F3 CD74-ROS1-WT subcutaneous xenograft tumor model, the TGIs of Crizotinib (30 mg/kg) and WX-001 (10 mg/kg) at 7 days of administration were 110.40% and 112.17% respectively, and the p values were all equal to 0.004, which showed significant anti-tumor effects.

Experimental conclusion: WX-001 has a significant inhibitory effect on the growth of Ba/F3 CD74-ROS1-WT nude mice transplanted tumor.

Experimental Embodiment 6: Efficacy Test of the Compounds in Mice

Experimental objective: To evaluate the anti-tumor effect of WX-001 in human-derived lung cancer LD1-0025-361019 PDX animal model.

Drug preparation: Compounds were formulated into clear solutions with 10% DMSO+10% solutol+80% water as the solvent for PO (gavage) group administration.

Figure 2:
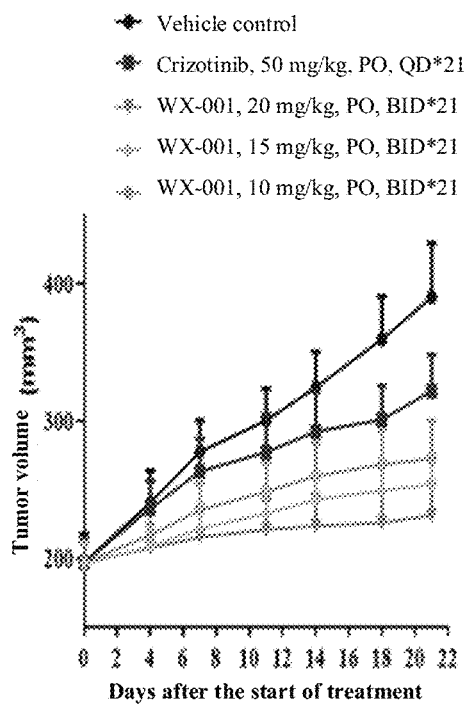
FIG. 2: Human-derived lung cancer LD1-0025-361019 PDX animal model; Vehicle control represents solvent control group.

Tumor measurement: Diameters of tumors were measured with vernier calipers twice a week. The calculation formula of tumor volume was: $V=0.5 \times a \times b^2$, wherein a and b represented the long and short diameters of the tumor, respectively. The anti-tumor efficacy of the compounds was evaluated by TGI (%). TGI (%) reflects the tumor growth inhibition rate. TGI (%)=[(1−(average tumor volume at the end of administration of a certain treatment group−average tumor volume at the beginning of administration of this treatment group))/(average tumor volume at the end of treatment in the solvent control group−average tumor volume at the beginning of treatment in the solvent control group)]×100%. The results are shown in FIG. 2.

Statistical analysis: All data were expressed by Mean±SEM. One-way ANOVA LSD test was used to compare whether there was a significant difference in tumor volume and tumor weight between the treatment group and the control group. All the data were analyzed by Graphpad. P<0.05 was considered as a significant difference.

Experimental results: At 21 days of administration on the human-derived lung cancer LD1-0025-361019 PDX animal model (CD74-ROS1 fusion & G2032R mutation), the tumor growth inhibition rate TGIs of Crizotinib (50 mg/kg) administration group, WX-001 high dose (20 mg/kg) administration group, WX-001 medium dose (15 mg/kg) administration group and WX-001 low dose (10 mg/kg) administration group were 35.43%, 82.38%, 70.03% and 60.83% respectively. Compared with the solvent control group, the WX-001 20 mg/kg administration group, the WX-001 15 mg/kg administration group and the WX-001 10 mg/kg administration group all showed significant inhibitory effects on tumor growth (P<0.01).

Experimental conclusion: In the human-derived lung cancer LD1-0025-361019 PDX animal model, WX-001 has a

The invention claimed is:

1. A compound represented by formula (IV) or a pharmaceutically acceptable salt thereof,

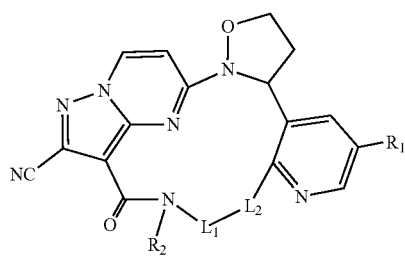
(IV)

wherein,
$R_1$ is selected from H, F, Cl, Br, I, OH, $NH_2$, CN and $C_{1-3}$ alkyl optionally substituted with 1, 2 or 3 $R_a$;
$R_2$ is selected from H and $C_{1-3}$ alkyl optionally substituted with 1, 2 or 3 $R_b$;
$L_1$ is selected from —$C_{1-3}$ alkyl-, —$C_{3-6}$ cycloalkyl- and —$C_{3-6}$ cycloalkyl-$C_{1-3}$ alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;
$L_2$ is selected from —$C_{1-3}$ alkyl-and-O—;
$R_a$, $R_b$ and $R_c$ are each independently selected from F, Cl, Br and $CH_3$.

2. The compound or the pharmaceutically acceptable salt thereof according to claim 1, wherein $R_1$ is selected from H, F, Cl, Br, I, OH, $NH_2$, CN and $CH_3$, and the $CH_3$ is optionally substituted with 1, 2 or 3 $R_a$.

3. The compound or the pharmaceutically acceptable salt thereof according to claim 2, wherein $R_1$ is F.

4. The compound or the pharmaceutically acceptable salt thereof according to claim 1, wherein $R_2$ is selected from H and $CH_3$.

5. The compound or the pharmaceutically acceptable salt thereof according to claim 1, wherein $L_1$ is selected from —$CH_2$—, —$CH(CH_3)CH_2$—, -cyclopropyl-$CH_2$— and -cyclobutyl-, and the —$CH_2$—, —$CH(CH_3)CH_2$—, -cyclopropyl-$CH_2$— and -cyclobutyl- are optionally substituted with 1, 2 or 3 $R_c$.

6. The compound or the pharmaceutically acceptable salt thereof according to claim 5, wherein $L_1$ is selected from —$CH_2$—, —$CH(CH_3)CH_2$—,

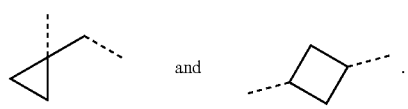 and .

7. The compound or the pharmaceutically acceptable salt thereof according to claim 1, wherein $L_2$ is selected from —$CH_2$— and —O—.

8. The compound or the pharmaceutically acceptable salt thereof according to claim 1, wherein the structural unit

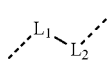

is selected from

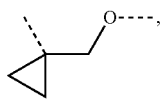 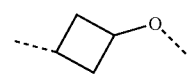 and

.

9. The compound or the pharmaceutically acceptable salt thereof according to claim 1, wherein the structural unit

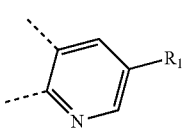

is selected from

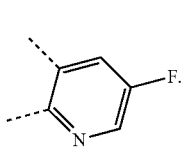.

10. The compound or the pharmaceutically acceptable salt thereof according to claim 1, wherein the compound is selected from:

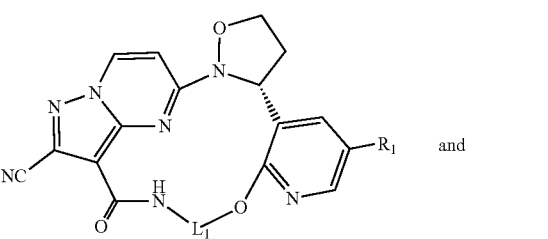
(IV-1)

and

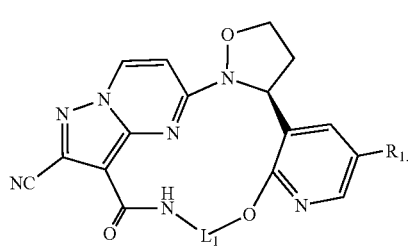
(IV-2)

11. A compound represented by the following formula or a pharmaceutically acceptable salt thereof, wherein the compound is selected from:

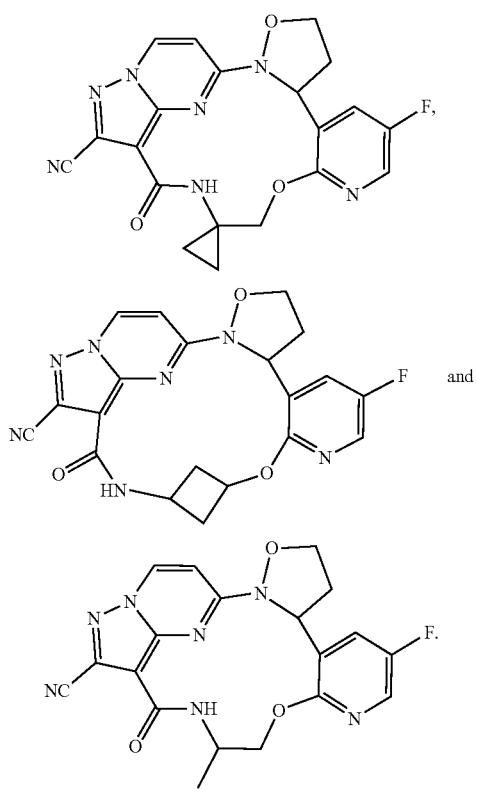

12. The compound or the pharmaceutically acceptable salt thereof according to claim 11, wherein the compound is selected from:

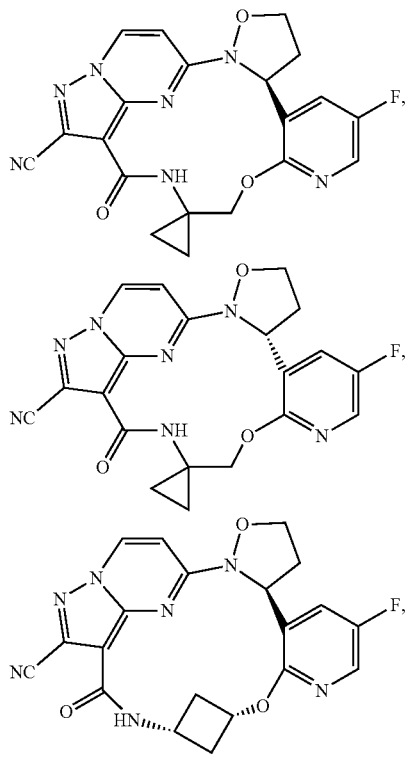

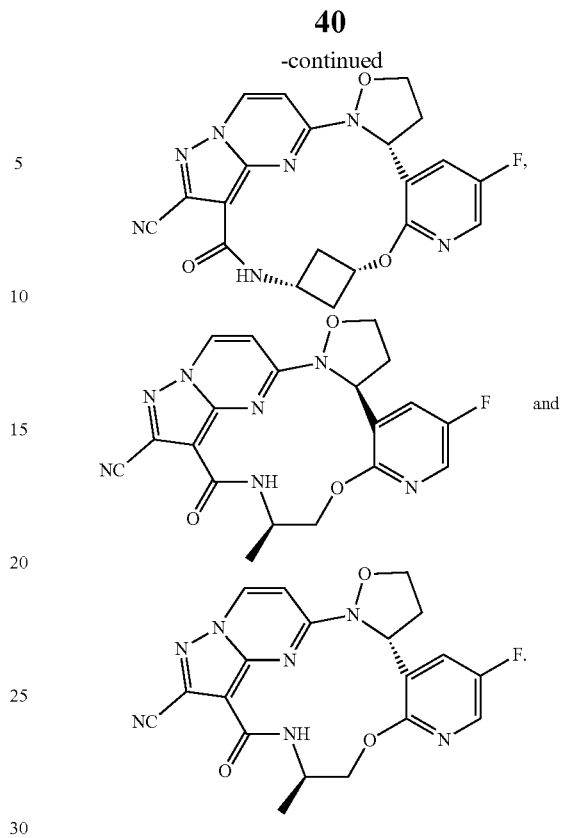

13. A compound represented by formula (V) or formula (VI),

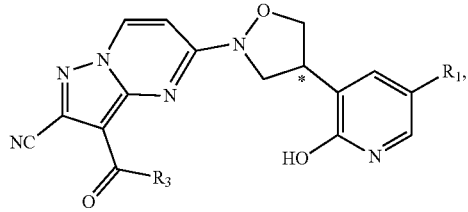

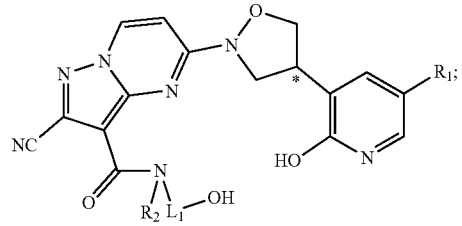

wherein,
R$_1$ is selected from H, F, Cl, Br, I, OH, NH$_2$, CN and C$_{1-3}$ alkyl optionally substituted with 1, 2 or 3 R$_a$;
R$_2$ is selected from H and C$_{1-3}$ alkyl optionally substituted with 1, 2 or 3 R$_b$;
R$_3$ is selected from OH and O—C$_{1-3}$ alkyl;
L$_1$ is selected from —C$_{1-3}$ alkyl-, —C$_{3-6}$ cycloalkyl- and —C$_{3-6}$ cycloalkyl-C$_{1-3}$ alkyl-, and the —C$_{1-3}$ alkyl-, —C$_{3-6}$ cycloalkyl- and —C$_{3-6}$ cycloalkyl-C$_{1-3}$ alkyl- are optionally substituted with 1, 2 or 3 R$_c$;
R$_a$, R$_b$ and R$_c$ are each independently selected from F, Cl, Br and CH$_3$.

14. A preparation method of the compound according to claim 1, wherein the method comprises the following reaction routes:

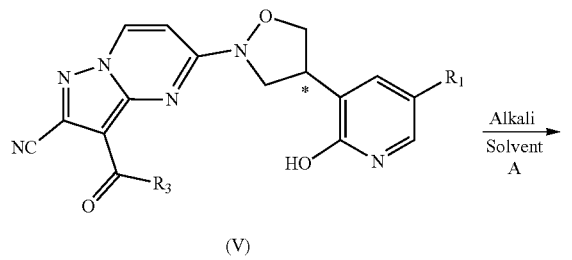

(V)

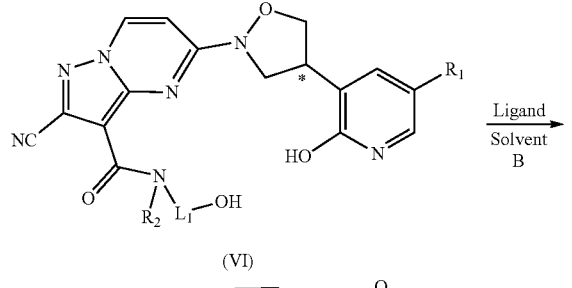

(VI)

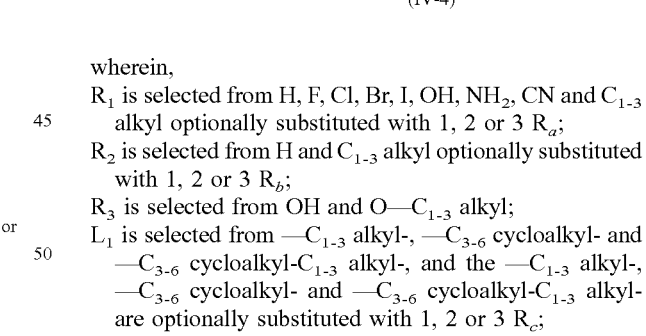

(IV-3) or

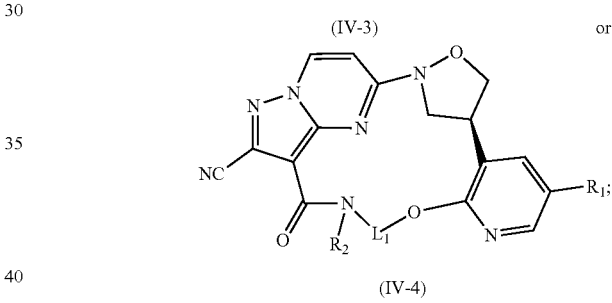

(IV-4)

or preparing the compound represented by formula (VI) from the compound represented by formula (V) under the condition of alkali and solvent A, and then preparing the compound represented by formula (IV) from the compound represented by formula (VI) under the condition of ligand and solvent B;

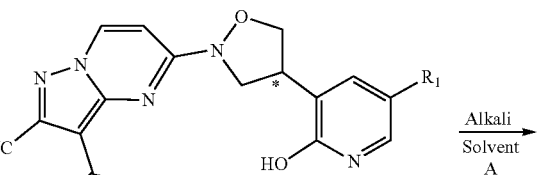

(V)

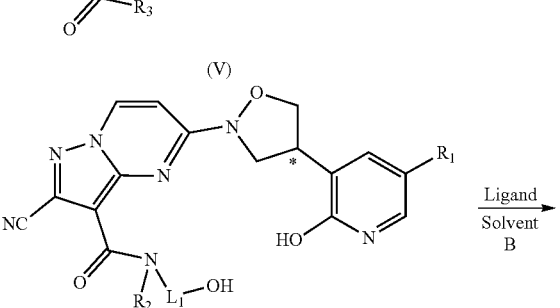

(VI)

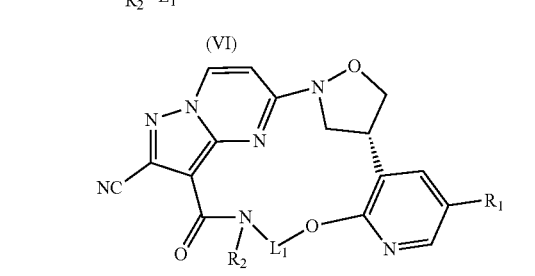

(IV-3) or

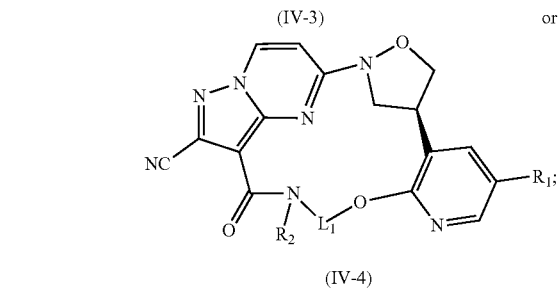

(IV-4)

wherein, $R_1$ is selected from H, F, Cl, Br, I, OH, $NH_2$, CN and $C_{1-3}$ alkyl optionally substituted with 1, 2 or 3 $R_a$;

$R_2$ is selected from H and $C_{1-3}$ alkyl optionally substituted with 1, 2 or 3 $R_b$;

$R_3$ is selected from OH and O—$C_{1-3}$ alkyl;

$L_1$ is selected from —$C_{1-3}$ alkyl-, —$C_{3-6}$ cycloalkyl- and —$C_{3-6}$ cycloalkyl-$C_{1-3}$ alkyl-, and the —$C_{1-3}$ alkyl-, —$C_{3-6}$ cycloalkyl- and —$C_{3-6}$ cycloalkyl-$C_{1-3}$ alkyl- are optionally substituted with 1, 2 or 3 $R_c$;

$R_a$, $R_b$ and $R_c$ are each independently selected from F, Cl, Br and $CH_3$;

the alkali is selected from lithium hydroxide, sodium hydroxide, potassium hydroxide, lithium carbonate, sodium carbonate, potassium carbonate, calcium carbonate, magnesium carbonate, lithium bicarbonate, sodium bicarbonate, potassium bicarbonate, calcium bicarbonate, magnesium bicarbonate, sodium formate, potassium propionate, trimethylamine, triethylamine, pyridine, 4-dimethylaminopyridine and N-ethyldiisopropylamine;

the solvent A is selected from N,N-dimethylformamide, acetonitrile, dichloromethane, dimethyl sulfoxide, N-methylpyrrolidone and N,N-dimethylacetamide;

the ligand is selected from triphenylphosphine, trimethylphenylphosphine, tricyclohexylphosphine, tri-tert-butylphosphine, tributylphosphine and diethylphenylphosphine;

the solvent B is selected from toluene, xylene, ethylene glycol dimethyl ether, dioxane, tetrahydrofuran, N,N-dimethylformamide, dimethyl sulfoxide and N-methylpyrrolidone.

15. A method for inhibiting ROS1 in a subject in need thereof, comprising administering the compound or the pharmaceutically acceptable salt thereof according to claim 1 to the subject.

16. A method for treating cancer in a subject in need thereof, comprising administering the compound or the pharmaceutically acceptable salt thereof according to claim 1 to the subject.

17. A method for treating lung cancer in a subject in need thereof, comprising administering the compound or the pharmaceutically acceptable salt thereof according to claim 1 to the subject.

18. The compound or the pharmaceutically acceptable salt thereof according to claim 1, wherein the compound is:

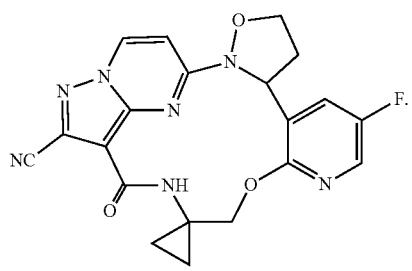

19. The compound or the pharmaceutically acceptable salt thereof according to claim 1, wherein the compound is:

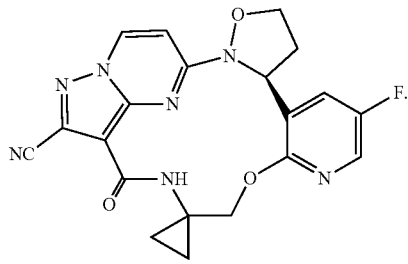 [SMILES: N#Cc1nn2ccc3nc2c1C(=O)NC1(CC1)COc1ncc(F)cc1[C@@H]1CCON31]

20. The compound or the pharmaceutically acceptable salt thereof according to claim 1, wherein the compound is:

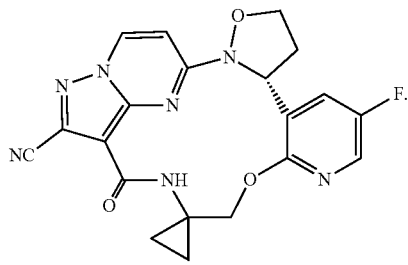 [SMILES: N#Cc1nn2ccc3nc2c1C(=O)NC1(CC1)COc1ncc(F)cc1[C@H]1CCON31]

* * * * *